US012397675B2

(12) United States Patent
Johnson et al.

(10) Patent No.: US 12,397,675 B2
(45) Date of Patent: Aug. 26, 2025

(54) UNMANNED AERIAL VEHICLE REMOTE FLIGHT PLANNING SYSTEM

(71) Applicant: Skydio, Inc., Redwood City, CA (US)

(72) Inventors: Eric David Johnson, Walnut Creek, CA (US); Alan Jay Poole, San Francisco, CA (US); Donald Curry Weigel, Los Altos, CA (US); Mark Patrick Bauer, San Francisco, CA (US); Volkan Gurel, San Francisco, CA (US); Jesse Daniel Kallman, San Francisco, CA (US); Adam Sax, San Francisco, CA (US)

(73) Assignee: Skydio, Inc., San Mateo, CA (US)

( * ) Notice: Subject to any disclaimer, the term of this patent is extended or adjusted under 35 U.S.C. 154(b) by 452 days.

(21) Appl. No.: 17/522,091

(22) Filed: Nov. 9, 2021

(65) Prior Publication Data

US 2022/0176846 A1 Jun. 9, 2022

Related U.S. Application Data

(63) Continuation of application No. 15/042,798, filed on Feb. 12, 2016, now abandoned.
(Continued)

(51) Int. Cl.
*B60L 58/12* (2019.01)
*G05D 1/00* (2006.01)
(Continued)

(52) U.S. Cl.
CPC ............ *B60L 58/12* (2019.02); *G05D 1/0044* (2013.01); *G08G 5/32* (2025.01); *G08G 5/34* (2025.01);
(Continued)

(58) Field of Classification Search
CPC .. B64C 39/024; G08G 5/0034; G08G 5/0039; G08G 5/0069; H04B 7/18506; H04L 43/16; H04W 4/021; B64U 2101/30
See application file for complete search history.

(56) References Cited

U.S. PATENT DOCUMENTS

| 5,550,736 A | 8/1996 | Jay et al. |
| 6,122,572 A | 9/2000 | Yavnai |

(Continued)

FOREIGN PATENT DOCUMENTS

| EP | 0758972 A1 | 2/1997 |
| EP | 1677172 A2 | 7/2006 |

(Continued)

OTHER PUBLICATIONS

International Search Report and Written Opinion of the International Searching Authority for International Application No. PCT/US2015/030229, dated Aug. 24, 2015, in 11 pages.
(Continued)

*Primary Examiner* — Gertrude Arthur Jeanglaude

(57) ABSTRACT

Methods, systems, and apparatus, including computer programs encoded on computer storage media, for unmanned aerial vehicle (UAV) flight planning. One of the methods includes receiving a location for an aerial survey to be conducted by a UAV. One or more images depicting the location are obtained, and a geofence boundary to limit flight of the UAV is determined. A survey area is determined, and a flight data package is created for transmission that includes information describing a flight plan. After the flight plan is conducted, flight log data and sensor data are received. The flight log data and sensor data are processed, and at least a portion of the processed sensor data is displayed.

20 Claims, 6 Drawing Sheets

Related U.S. Application Data

(60) Provisional application No. 62/116,282, filed on Feb. 13, 2015.

(51) Int. Cl.

| | | |
|---|---|---|
| *G08G 5/32* | (2025.01) | |
| *G08G 5/34* | (2025.01) | |
| *G08G 5/55* | (2025.01) | |
| *G08G 5/57* | (2025.01) | |
| *H04B 7/185* | (2006.01) | |
| *H04L 43/16* | (2022.01) | |
| *H04W 4/021* | (2018.01) | |
| *B64U 101/30* | (2023.01) | |

(52) U.S. Cl.
CPC ............... *G08G 5/55* (2025.01); *G08G 5/57* (2025.01); *H04B 7/18506* (2013.01); *H04L 43/16* (2013.01); *H04W 4/021* (2013.01); *B64U 2101/30* (2023.01)

(56) References Cited

U.S. PATENT DOCUMENTS

| | | | |
|---|---|---|---|
| 6,176,451 B1 | 1/2001 | Drymon | |
| 6,289,467 B1 | 9/2001 | Lewis et al. | |
| 6,497,388 B1 | 12/2002 | Friend et al. | |
| 6,522,867 B1 | 2/2003 | Wright et al. | |
| 6,665,594 B1 | 12/2003 | Armstrong | |
| 6,665,613 B2 | 12/2003 | Duvall | |
| 6,754,566 B2 | 6/2004 | Shimel | |
| 6,873,886 B1 | 3/2005 | Mullen et al. | |
| 7,093,798 B2 | 8/2006 | Whelan et al. | |
| 7,127,334 B2 | 10/2006 | Frink | |
| 7,418,320 B1 | 8/2008 | Bodin et al. | |
| 7,762,496 B2 | 7/2010 | Seiersen et al. | |
| 7,912,630 B2 | 3/2011 | Alewine et al. | |
| 7,938,362 B2 | 5/2011 | Kismarton et al. | |
| 8,000,689 B2 | 8/2011 | Featherstone et al. | |
| 8,032,267 B1 | 10/2011 | Simon | |
| 8,073,578 B1 | 12/2011 | McCusker | |
| 8,082,074 B2 | 12/2011 | Duggan et al. | |
| 8,100,362 B2 | 1/2012 | Guering | |
| 8,111,154 B1 | 2/2012 | Puri et al. | |
| 8,213,957 B2 | 7/2012 | Bull et al. | |
| 8,223,012 B1 | 7/2012 | Diem | |
| 8,256,715 B2 | 9/2012 | Ballard et al. | |
| 8,260,479 B2 | 9/2012 | Christenson et al. | |
| 8,275,499 B2 | 9/2012 | Coulmeau et al. | |
| 8,284,748 B2 | 10/2012 | Borghei | |
| 8,306,737 B2 | 11/2012 | Nguyen | |
| 8,308,108 B2 | 11/2012 | Cazals et al. | |
| 8,352,097 B2 | 1/2013 | Crumm et al. | |
| 8,360,362 B2 | 1/2013 | Kismarton et al. | |
| 8,412,166 B2 | 4/2013 | Ellanti et al. | |
| 8,515,609 B2 | 8/2013 | McAndrew et al. | |
| 8,531,293 B2 | 9/2013 | Putz | |
| 8,543,265 B2 | 9/2013 | Ekhaguere et al. | |
| 8,600,602 B1 | 12/2013 | McAndrew et al. | |
| 8,626,361 B2 * | 1/2014 | Gerlock | G08G 5/0069 701/13 |
| 8,655,593 B1 | 2/2014 | Davidson | |
| 8,751,144 B2 | 6/2014 | Tzao et al. | |
| 8,825,225 B1 * | 9/2014 | Stark | G09F 27/00 701/4 |
| 8,862,285 B2 | 10/2014 | Wong et al. | |
| 8,874,283 B1 | 10/2014 | Cavote | |
| 8,876,571 B2 | 11/2014 | Trowbridge et al. | |
| 8,880,241 B2 | 11/2014 | Mohamadi | |
| 8,903,568 B1 | 12/2014 | Wang et al. | |
| 8,938,160 B2 | 1/2015 | Wang | |
| 8,941,489 B2 * | 1/2015 | Sheshadri | H04W 4/021 701/422 |
| 8,965,598 B2 | 2/2015 | Kruglick | |
| 9,043,106 B2 | 5/2015 | Ingram et al. | |
| 9,066,464 B2 | 6/2015 | Schmidt et al. | |
| 9,075,415 B2 | 7/2015 | Kugelmass | |
| 9,256,225 B2 | 2/2016 | Downey et al. | |
| 9,256,994 B2 | 2/2016 | Downey et al. | |
| 9,273,981 B1 | 3/2016 | Downey et al. | |
| 9,310,221 B1 | 4/2016 | Downey et al. | |
| 9,311,760 B2 | 4/2016 | Downey et al. | |
| 9,340,283 B1 | 5/2016 | Downey et al. | |
| 9,403,593 B2 | 8/2016 | Downey et al. | |
| 9,406,237 B2 | 8/2016 | Downey et al. | |
| 9,508,263 B1 | 11/2016 | Teng et al. | |
| 2003/0060938 A1 | 3/2003 | Duvall | |
| 2003/0065428 A1 | 4/2003 | Mendelson et al. | |
| 2003/0093187 A1 | 5/2003 | Walker | |
| 2004/0036630 A1 | 2/2004 | Jamieson et al. | |
| 2004/0068351 A1 | 4/2004 | Solomon | |
| 2004/0162638 A1 | 8/2004 | Solomon | |
| 2005/0060213 A1 | 3/2005 | Lavu et al. | |
| 2005/0156715 A1 | 7/2005 | Zou et al. | |
| 2005/0159883 A1 | 7/2005 | Humphries et al. | |
| 2006/0155425 A1 | 7/2006 | Howlett et al. | |
| 2006/0167597 A1 | 7/2006 | Bodin et al. | |
| 2006/0262781 A1 | 11/2006 | Campini et al. | |
| 2006/0270421 A1 | 11/2006 | Phillips et al. | |
| 2007/0069083 A1 | 3/2007 | Shams et al. | |
| 2007/0100538 A1 | 5/2007 | Wise et al. | |
| 2007/0112475 A1 | 5/2007 | Koebler et al. | |
| 2007/0138345 A1 | 6/2007 | Shuster | |
| 2007/0266192 A1 | 11/2007 | Campini et al. | |
| 2008/0007928 A1 | 1/2008 | Salama et al. | |
| 2008/0077299 A1 | 3/2008 | Arshad et al. | |
| 2008/0094256 A1 | 4/2008 | Koen | |
| 2008/0174448 A1 | 7/2008 | Hudson | |
| 2008/0178463 A1 | 7/2008 | Okubora | |
| 2008/0186165 A1 | 8/2008 | Bertagna et al. | |
| 2008/0210809 A1 | 9/2008 | Arlton et al. | |
| 2008/0255711 A1 | 10/2008 | Matos | |
| 2009/0087029 A1 | 4/2009 | Coleman et al. | |
| 2009/0088972 A1 | 4/2009 | Bushnell | |
| 2009/0114764 A1 | 5/2009 | Builta et al. | |
| 2009/0150070 A1 | 6/2009 | Alewine et al. | |
| 2009/0210109 A1 | 8/2009 | Ravenscroft | |
| 2009/0219393 A1 | 9/2009 | Vian et al. | |
| 2009/0312032 A1 | 12/2009 | Bornstein et al. | |
| 2010/0004798 A1 | 1/2010 | Bodin et al. | |
| 2010/0042940 A1 | 2/2010 | Monday et al. | |
| 2010/0049987 A1 | 2/2010 | Ettorre et al. | |
| 2010/0084513 A1 | 4/2010 | Gariepy et al. | |
| 2010/0145556 A1 | 6/2010 | Christenson et al. | |
| 2010/0155611 A1 | 6/2010 | Fullwood et al. | |
| 2010/0168937 A1 | 7/2010 | Soijer et al. | |
| 2010/0201806 A1 | 8/2010 | Nygaard et al. | |
| 2010/0235032 A1 | 9/2010 | Sung et al. | |
| 2011/0022770 A1 | 1/2011 | Sullivan | |
| 2011/0035149 A1 | 2/2011 | McAndrew et al. | |
| 2011/0130636 A1 | 6/2011 | Daniel et al. | |
| 2011/0130913 A1 | 6/2011 | Duggan et al. | |
| 2011/0133888 A1 | 6/2011 | Stevens et al. | |
| 2011/0178811 A1 | 7/2011 | Sheridan | |
| 2011/0196564 A1 | 8/2011 | Coulmeau | |
| 2011/0258021 A1 | 10/2011 | Mumaw et al. | |
| 2011/0264312 A1 | 10/2011 | Spinelli et al. | |
| 2011/0301784 A1 | 12/2011 | Oakley et al. | |
| 2011/0320068 A1 | 12/2011 | Lee et al. | |
| 2012/0022719 A1 | 1/2012 | Matos | |
| 2012/0035787 A1 | 2/2012 | Dunkelberger et al. | |
| 2012/0044710 A1 | 2/2012 | Jones | |
| 2012/0104517 A1 | 5/2012 | Huang et al. | |
| 2012/0143482 A1 | 6/2012 | Goossen et al. | |
| 2012/0209457 A1 | 8/2012 | Bushnell | |
| 2012/0232722 A1 | 9/2012 | Fisher et al. | |
| 2012/0233447 A1 | 9/2012 | Fitzgerald | |
| 2012/0253555 A1 | 10/2012 | Stange | |
| 2012/0271491 A1 | 10/2012 | Spata | |
| 2012/0296499 A1 | 11/2012 | Kirchhofer et al. | |
| 2012/0299751 A1 | 11/2012 | Verna et al. | |
| 2012/0319815 A1 | 12/2012 | Feldman | |
| 2012/0320203 A1 | 12/2012 | Liu | |
| 2013/0009013 A1 | 1/2013 | Bourakov et al. | |

(56) References Cited

U.S. PATENT DOCUMENTS

| | | |
|---|---|---|
| 2013/0085669 A1 | 4/2013 | Bailey et al. |
| 2013/0099048 A1 | 4/2013 | Fisher et al. |
| 2013/0345920 A1 | 12/2013 | Duggan et al. |
| 2014/0018976 A1 | 1/2014 | Goossen et al. |
| 2014/0018979 A1 | 1/2014 | Goossen et al. |
| 2014/0025229 A1 | 1/2014 | Levien et al. |
| 2014/0032034 A1 | 1/2014 | Raptopoulos et al. |
| 2014/0163852 A1 | 6/2014 | Borri et al. |
| 2014/0172194 A1 | 6/2014 | Levien et al. |
| 2014/0212986 A1 | 7/2014 | Angelescu et al. |
| 2014/0222248 A1 | 8/2014 | Levien et al. |
| 2014/0244078 A1 | 8/2014 | Downey et al. |
| 2014/0249693 A1* | 9/2014 | Stark .................... B64D 47/02 701/2 |
| 2014/0277834 A1 | 9/2014 | Levien et al. |
| 2014/0316616 A1 | 10/2014 | Kugelmass |
| 2014/0319272 A1 | 10/2014 | Magana et al. |
| 2014/0325644 A1 | 10/2014 | Oberg et al. |
| 2015/0057012 A1 | 2/2015 | Hong et al. |
| 2015/0066248 A1 | 3/2015 | Arbeit et al. |
| 2015/0115108 A1 | 4/2015 | Benson et al. |
| 2015/0225081 A1 | 8/2015 | Stabler et al. |
| 2015/0239365 A1 | 8/2015 | Hyde et al. |
| 2015/0317924 A1 | 11/2015 | Park |
| 2015/0336671 A1 | 11/2015 | Winn et al. |
| 2015/0379874 A1 | 12/2015 | Ubhi et al. |
| 2016/0025457 A1 | 1/2016 | Miralles |
| 2016/0111006 A1 | 4/2016 | Srivastava et al. |
| 2016/0282861 A1 | 9/2016 | Golden et al. |
| 2017/0169713 A1 | 6/2017 | Gong et al. |
| 2017/0301242 A1 | 10/2017 | Yu et al. |

FOREIGN PATENT DOCUMENTS

| | | |
|---|---|---|
| EP | 2156216 A1 | 2/2010 |
| EP | 2212199 A1 | 8/2010 |
| JP | 06-195125 | 7/1994 |
| JP | 08048297 | 2/1996 |
| WO | 2013163746 A1 | 11/2013 |

OTHER PUBLICATIONS

Extended European Search Report dated Jul. 30, 2015, regarding Application No. EP 12 83 9320, 5 pages.

International Search Report and Written Opinion dated May 30, 2013 for International Application No. PCT/US2013/051227.

International Search Report and Written Opinion dated Mar. 4, 2016 for International Application No. PCT/US2015/030231.

International Search Report and Written Opinion of the International Searching Authroity for International Application No. PCT/US2016/017869, dated May 3, 2016, 19 pages.

* cited by examiner

US 12,397,675 B2

UNMANNED AERIAL VEHICLE REMOTE FLIGHT PLANNING SYSTEM

CROSS-REFERENCE TO RELATED APPLICATION(S)

This application claims priority to and the benefit of U.S. patent application Ser. No. 15/042,798, filed Feb. 12, 2016, which claims the benefit of priority to U.S. Provisional Patent Application No. 62/116,282 filed Feb. 13, 2015, the entire disclosure of which is hereby incorporated by reference.

BACKGROUND

Given the increasing use of unmanned aerial vehicles (UAVs) in populated areas, and around various structures, a flight planning system is needed to generate automated flight plans that include safety and regulatory considerations.

SUMMARY

In general, one optional innovative aspect of the subject matter described in this specification can be embodied in methods that include the actions of receive, via a user interface, a location for an aerial survey to be conducted by an unmanned aerial vehicle (UAV); display, via the user interface, one or more images depicting a view of the location; determine a geofence boundary over the one or more location images, wherein the geofence boundary represents a geospatial boundary in which to limit flight of the UAV; determine a survey area over the one or more location images, wherein the survey area is set within the geofence boundary; determine a flight plan based, at least in part, on the survey area, the flight plan having a launch location, a landing location, and flight waypoints, wherein the launch location, the landing location and flight waypoints are set within the geofence boundary; generate a flight data package for transmission to a ground control station, the flight data package comprising at least the flight plan; store information associated with the flight plan in a data repository; transmit the flight data package to the ground control station, wherein the ground control station is configured to transmit at least a portion of the flight data package to the UAV to conduct the flight plan and to collect sensor data; receive, from the ground control station, flight log data and collected sensor data after the UAV has conducted the flight plan; and display, via the user interface, at least a portion of the sensor data, or processed sensor data, and information associated with the flight data package.

Particular embodiments of the subject matter described can be implemented so as to realize one or more of the following advantages. A system can receive succinct user input describing a flight plan, and generate a complex flight plan for an unmanned aerial vehicle (UAV) to implement. The system can further package the described flight plan in a flight authorization request to be provided to specific entities, such as a regulatory agency (e.g., the Federal Aviation Administration (FAA)), for approval of the flight plan. In addition, the system can determine one or more measures quantifying a risk associated with the described flight plan. To effect the quantification, the system can store information describing UAVs, particular components included in each UAV (e.g., electrical components, static mechanical components, actuators, engines, props, sensors, batteries, parachutes, landing gear, antennas, etc.), and/or UAV operators, and determine risk information associated with the components. For instance, the system can rapidly determine that a particular component has experienced errors in the past (e.g., where the number and/or type of errors exceed a threshold), and based at least in part on such determination, should not be included in a flight plan due to the increased possibility of a potential failure. Similarly, the system can determine a risk associated with a particular human operator, and can provide the risk information to the regulatory agency, or an insurance entity.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

Like reference numbers and designations in the various drawings indicate like elements.

DETAILED DESCRIPTION

Figure 1:
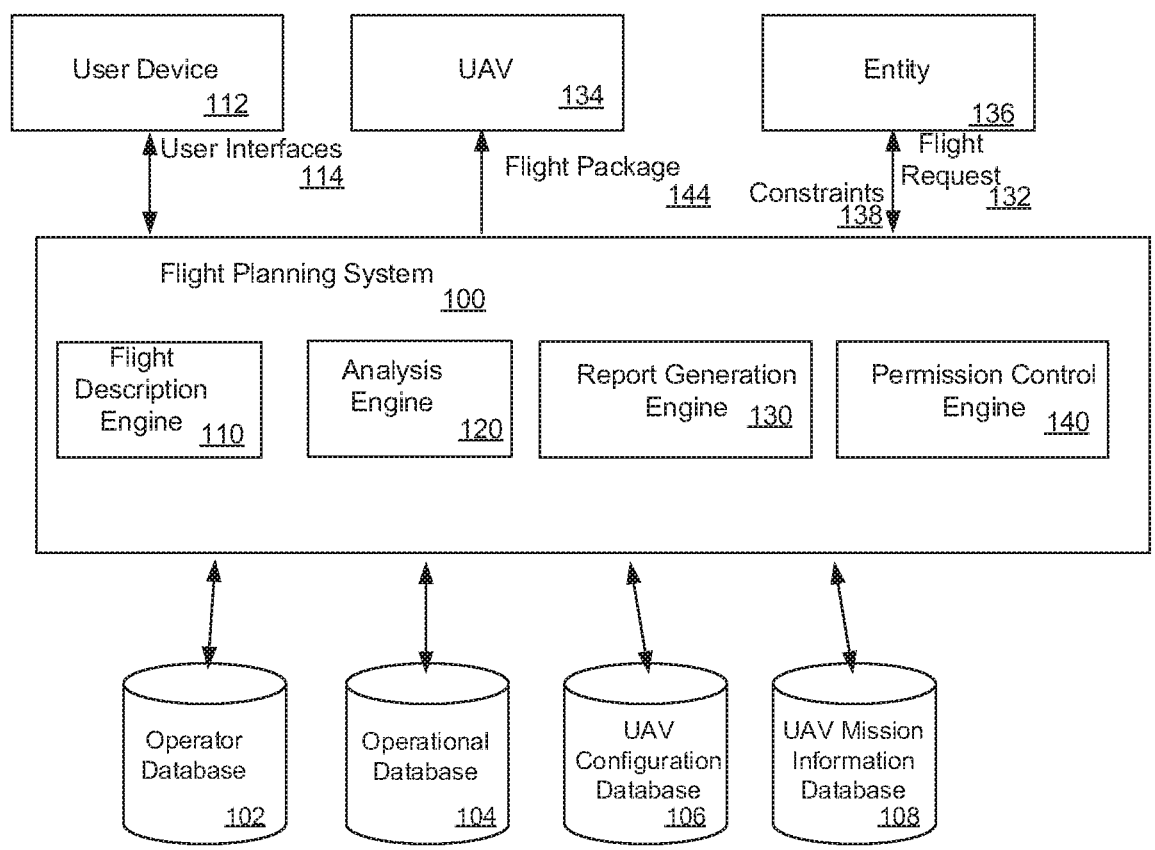
FIG. 1 illustrates a block diagram of an example flight planning system.

Among other features, this specification describes a remote flight planning system that can enable a user to describe a flight plan to be implemented by an unmanned aerial vehicle (UAV). Optionally, the described flight plan can be implemented in concert with an operator (e.g., located within a threshold distance of the UAV) utilizing a user device (e.g., a laptop, a tablet), also called a Ground Control Station, who can provide instructions or information to the UAV. The flight plan can involve conducting one or more types of surveys associated with a particular location (e.g., a home, a vertical structure), such as identifying damage caused by weather, general wear, and so on.

As will be described, a flight plan can include one or more geofence boundaries for a UAV to enforce (e.g., a virtual perimeter, or volume of space, for a real-world geographic area, or volume, that limits allowable location of the UAV to locations within the geographic area, or volume), location information identifying one or more safe take-off and landing locations, flight pattern information (e.g., one or more waypoints for the UAV to travel to during the flight plan and associated actions to take at each waypoint), particular survey or flight mission information (e.g., damage inspection of structures), and so on. The user can utilize interactive user interfaces generated by the system to indicate information associated with the flight plan, and the system can generate a flight data package to be provided to a UAV, and/or an operator's user device, to implement the flight plan. Non-limiting examples of UAVs include single rotor copters, multi-rotor copters (e.g., a quad-copter), and propeller and jet fixed wing aircraft. In this specification, the flight data package can, in some implementations, include an information describing a flight plan that is sufficient for a UAV, and/or a user device, to implement the flight plan.

In addition, the system can automatically determine risks associated with the described flight plan, which can include any information that can inform, or affect, a safe, or functional, flight plan. For instance, the system can determine risks associated with the flight pattern, contingency plans (e.g., flight plans or behaviors to be autonomously executed upon detection of an off-nominal event), flight worthiness of the UAV, risks associated with the operator, and so on. To determine risks associated with the flight plan, the system can obtain, and store, operator data (e.g., operator information such as hours flown, trainings completed and licenses obtained), UAV configuration information for particular UAVs (e.g., information identifying components of each UAV, such as specific components, the UAV type, component redundancy, failure tolerance (e.g., can the UAV be flown safely even if one rotor motor fails), associated software versions, and/or weights of the components, optionally along with flight information, such as contingency plans), operational information (e.g., information gleaned or collected after respective flights or maintenances of particular UAVs), and/or mission information (e.g., information generated by flight critical systems or payload systems included in the UAV, such as video, images, signals intelligence, and so on). The system can determine degradation or potential degradation of components in a UAV (e.g., since a last maintenance), flight totals and mean (or other measure of central tendency) flight time of operators, and so on. The system can therefore determine risks of particular UAVs or UAV-types being utilized, components included in UAVs (e.g., to identify a faulty type of component before flight failure can occur), and/or particular operators.

Utilizing the determined risks associated with the flight plan, the system can provide recommendations to the user to lower the determined risks, and optionally increase the likelihood that the flight plan will be approved by a regulatory agency (e.g., the Federal Aviation Administration (FAA)) and/or policies set by other entities (e.g., those of a company for whom a mission is to be flown, those of an entity ensuring the UAV and/or flight, etc.). For instance, the system can recommend that the user select a particular UAV and/or type of UAV (e.g., a single copter, a multi-rotor copter (e.g., a quad-copter), a fixed wing aircraft, etc.) out of a group of available UAVs. Additionally, the determined risks can be utilized by an insurance entity to determine estimates associated with insuring the flight plan. Since the determined risk information is determined from empirically obtained and tracked information, the insurance entity can have greater faith in the risk information presented to them.

As will be described, the system can generate flight authorization requests (e.g., the system can package the described flight plan into a format proscribed for use by a regulatory agency) to be provided to an entity for approval. The system can receive approval of the flight authorization request, and provide the approved flight plan as a flight data package to a UAV. Furthermore, the system can receive modifications to the flight authorization request from the entity (e.g., the regulatory agency can specify that the UAV is to fly at a lower altitude, a reduced speed, involve an operator with greater certifications, include newer components, include a battery with more capacity, and so on), and the system can modify the described flight plan in accordance with the received modifications. In this way, flight plans can be generated, risk quantified, approved, and modified, quickly and accurately, increasing the ability of an organization to quickly plan and implement flight plans.

In this specification, UAVs, such as drones, un-operated aerial vehicles, remotely operated aircraft, unmanned aircraft systems, any aircraft covered under Circular 328 AN/190 classified by the International Civil Aviation Organization, and so on. In addition, certain aspects of the disclosure can be utilized with other types of unmanned vehicles (e.g., wheeled, tracked, and/or water vehicles). Sensors, which are included in the general term payload modules (e.g., any hardware, software, module, and so on, that is not critical to the flight operation of the UAV), can include any device that captures real-world information, including cameras, radiation measuring instruments, distance detectors such as Lidar, and so on.

FIG. 1 illustrates a block diagram of an example flight planning system 100. The various illustrated components may communicate over wired and/or wireless communication channels (e.g., networks, peripheral buses, etc.). The flight planning system 100 can be a system of one or more computers, or software executing on a system of one or more computers, which is in communication with, or maintains, one or more databases, e.g., databases 102-108, storing information describing prior implemented flight plans and information associated with each flight plan (e.g., information describing a UAV, an operator, and so on). The flight planning system 100 can receive (e.g., from a user), and determine, information describing a flight plan, and provide a flight data package 144 associated with the flight plan to a UAV (e.g., UAV 134) to implement. Additionally, the flight planning system 10 can analyze performance characteristics of information stored in the databases, and determine risk information for presentation to a user, or for inclusion in a flight authorization request to an entity (e.g., a regulatory agency).

The example flight planning system 100 includes a flight description engine 110 that can generate interactive user interfaces 114 (e.g., web pages to be rendered by a user device) for presentation on a user device (e.g., user device 112). The interactive user interfaces 114 may optionally be transmitted for display to the user device via a wireless network or other communication channel. A user of the user device (e.g., user device 112) can provide information describing a flight plan to be performed (e.g., by UAV 134).

For instance, to describe one or more locations at which the flight plan is to take place, a user interface may be provided (e.g., an interactive user interface 114) configured to receive, from the user, location information associated with the flight plan (e.g., an address of a home or property, global positioning system (GPS) coordinates of a structure to be inspected, and so on), and the flight description engine 110 can obtain information describing the location. For instance, the information can include property boundaries associated with an address (e.g., boundaries of a home, obtained from a database, or system, that stores or can access property boundary information), obstacles associated with the location (e.g., nearby trees, electrical towers, telephone poles) and/or other information. Additionally, the flight description engine 110 can obtain imagery, such as geo-rectified imagery (e.g., satellite imagery), associated with the entered location information. The flight description engine 110 can include some or all of the information describing the location (e.g., the obtained imagery or boundary information) in an interactive user interface 114 to be presented to a user of the user device 112.

Figure 2:
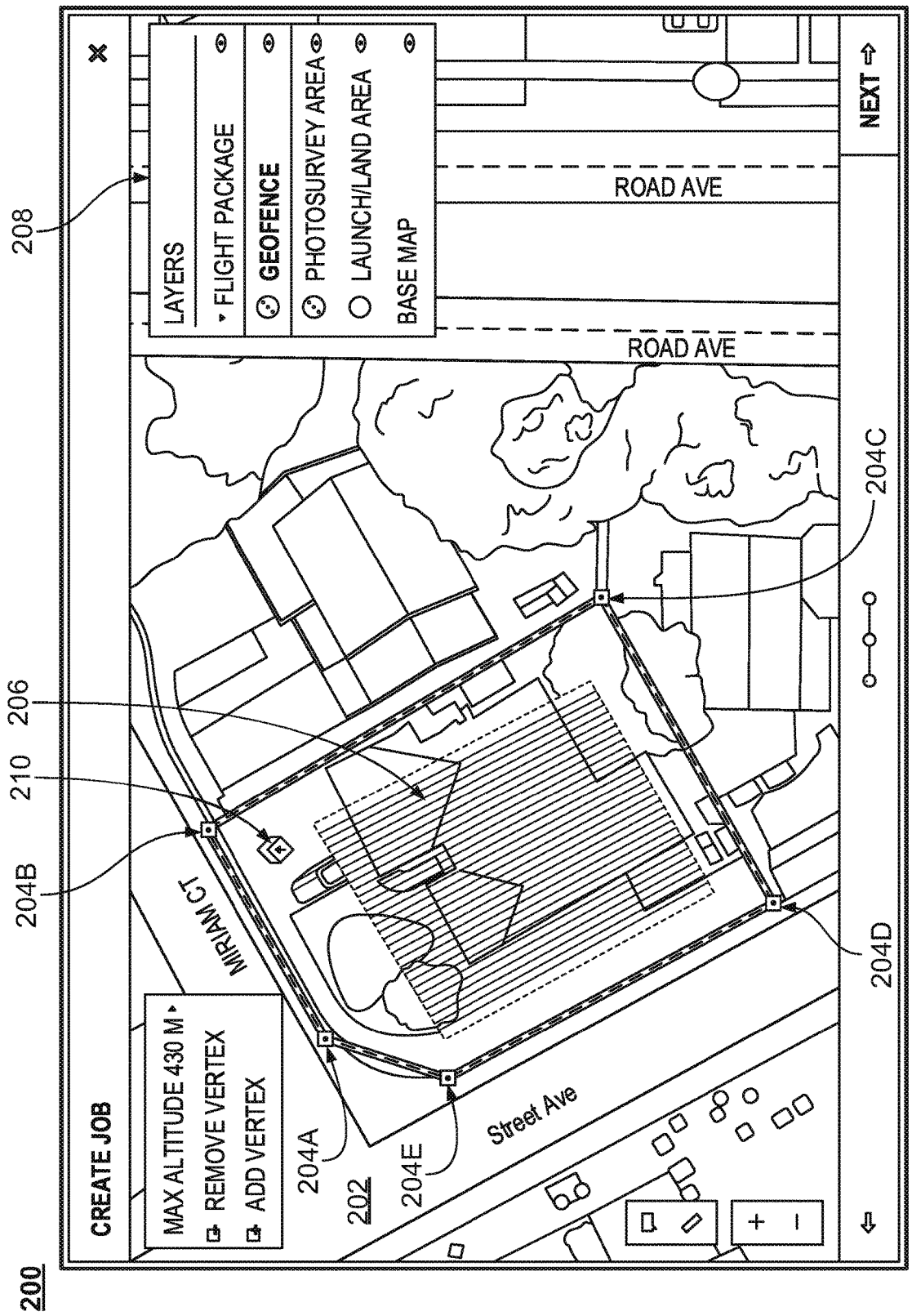
FIG. 2 illustrates an example user interface to indicate flight planning information

The user of the user device 112 can interact with the received user interfaces 114 to describe a geofence boundary for a UAV to enforce. For instance, the user device 112 can receive imagery associated with the entered location information, and one or more geofence shapes may be presented. The user interface 114 enables the user to select a presented shape (e.g., a polygon), and further enables the user to drag and/or drop the shape to surround an area of interest in the received imagery that limits allowable locations of a UAV to locations within the shape. Optionally, the user interface 114 enables a user of the user device 112 to trace (e.g., using a finger or stylus) a particular shape onto a touch-screen display of the user device 112, and the flight description engine 110 can store information describing the trace as a geofence boundary. That is, the user device 112 can provide information describing the traced shape to the flight description engine 110 (e.g., coordinates associated with the imagery), and the flight description engine 110 can correlate the traced shape to location information in the real-world as illustrated by the imagery (e.g., GPS coordinates that correspond to the traced shape). An example of a user interacting with a user interface to describe a geofence boundary is illustrated in FIG. 2.

Similarly, a user interface 114 enables the user to describe safe locations for a UAV to begin the flight plan (e.g., a take-off location) and end the flight plan (e.g., a landing location). As an example, the flight description engine 110 can analyze the obtained imagery associated with the entered location information, and identify a geometric center of a convex area (e.g., a biggest convex area) within the geofence boundary that does not include obstructions (e.g., trees), such as an open pasture. Similarly, the flight description engine 110 can obtain topological information associated with the entered location information, and can detect substantially flat areas (e.g., areas with less than a threshold of variance in height). For instance, the flight description engine 110 can determine that an open clearing (e.g., an open clearing that is substantially flat) is a safe location for the UAV to take-off from, and can provide information recommending the open clearing in an interactive user interface 114 presented on the user device 112. Additionally, the flight description engine 110 can analyze the obtained imagery and locate physical features that are known to generally be safe locations for take-off and landing. For example, the flight description engine 110 can determine that a driveway of a home associated with the flight plan is safe, and can select the driveway as a safe take-off and landing location, or can recommend the driveway as a safe take-off and landing location.

The flight description engine 110 can receive survey or flight mission information, for instance information indicating a particular type of survey for a UAV to perform (e.g., damage inspection, inspection of a vertical structure, inspection of a rooftop). The flight description engine 110 can receive waypoints for the UAV to travel to, including an order in which the waypoints are to be traveled to, a ranking or importance of each, or a group of, waypoints, and specific actions for the UAV to take while traveling to, or after reaching, each waypoint. For instance, a user interface optionally enables the user of the user device 112 to specify that upon reaching a particular waypoint, the UAV is to activate a particular sensor, or other payload module, such as an infra-red camera, a sensor measuring radiation, and so on. Additionally, a user interface optionally enables the user to specify transition speeds the UAV is to use when travelling between waypoints, or between particular waypoints.

The flight description engine 110 can receive information describing, or relevant to, configuration information of a UAV, such as a type of UAV (e.g., fixed-wing, single rotor, multi-rotor, and so on), sensors or other payload modules required for the survey or flight mission information, and general functionality to be performed. The flight description engine 110 can then determine recommendations of particular UAVs (e.g., UAVs available to perform the flight plan) that comport with the received information. Similarly, the flight description engine 110 can determine that, based off the received survey type, a UAV will require particular configuration information, and recommend the configuration information to the user. For instance, the flight description engine 110 receive information identifying that hail damage is expected, or is to be looked for, and can determine that a UAV which includes particular sensors, and specific visual classifiers to identify hail damage, is needed (e.g., a heat and/or thermal imaging sensors, specific visual classifiers that can discriminate hail damage from other types of damage, wind damage, rain damage, and so on). The flight description engine 110 may recommend a particular vehicle type, class and payload configuration of UAV based on the overall distance, or estimated flight time for a flight mission. For example, a fixed-wing aircraft may be recommended if the overall flight time of the mission is estimated to be over 30 minutes. In other instances, a multi-rotor may be recommended if the estimated flight time is less than 30 minutes.

The received survey or flight mission information can be utilized to determine, by the flight description engine 110, a flight pattern for a UAV to follow. For instance, the flight description engine 110 can determine a path for the UAV to follow between each waypoint (e.g., ensuring that the UAV remains in the geofence boundary). Additionally, the flight description engine 110 can determine, or receive information indicating, a safe minimum altitude for the UAV to enforce, indicating an altitude at which the UAV is safe to travel between waypoints. The safe minimum altitude can be a height at which the UAV will not encounter obstacles within the geofence boundary (e.g., a height above buildings, trees, towers, poles, and so on). Similarly, the safe minimum altitude can be based off a ground sampling distance (GSD) indicating a minimum resolution that will be required from imagery obtained by the UAV while implementing the flight plan (e.g., based in part on capabilities of an included camera, such as sensor resolution, sensor size, and so on).

The flight description engine 110 can receive a time that the flight plan is to be performed (e.g., a particular day, a particular time at a particular day, a range of times, and so on). The flight description engine 110 can then determine an availability of UAVs and/or operators at the received time(s) (e.g., the engine 110 can obtain scheduling information). Additionally, the flight description engine 110 can filter the available UAVs according to determined configuration information (e.g., as described above). Optionally, the flight description engine 110 can access weather information associated with the received time(s), and determine an optimal time or range of times for the job to be performed. For instance, a UAV that includes particular sensors (e.g., electro-optic sensors) can obtain better real-world information at particular times of day (e.g., at noon on a sunny day can provide better imagery by maximizing image contrast and minimizing the effects of shadows).

As will be described, the flight planning system 100 can provide the determined flight plan as a flight data package 144 to a UAV (e.g., the UAV 134). Optionally, the flight planning system 100 can provide the flight data package 144 to a user device of an operator, and the operator can modify the described flight plan, and provide the flight data package 144 to the UAV 134. Optionally, the flight data package 144 can include a flight manifest file (e.g., an XML file) identifying necessary application and version information to conduct the flight plan. For instance, the UAV can be required to execute a particular application (e.g., "app" downloaded from an electronic application store) that provides functionality necessary to conduct the flight plan. As an example, an application can effect a flight plan associated with inspecting vertical structures, and the UAV can be required to execute the application prior to initiation of the flight plan. If the UAV computer system does not have the requisite application, the UAV may request from an application store, the necessary application, and automatically install the application. Similarly, the user device may need a particular application for use with the UAV, the user device may receive a download of the necessary application from an application store.

As described above, the flight planning system 100 can determine risk information associated with the described flight plan. The risk information can be utilized in a number of ways, including as information to be provided to the user when the user is providing information describing the flight plan in the user interfaces 114. For instance, the flight planning system 100 can receive information indicating a number of waypoints, and calculate a total distance that will be traveled by a UAV. The flight planning system 100 can identify one or more UAVs that include fuel (e.g., gas, battery) sufficient to travel the total distance. Additionally, the flight planning system 100 can determine one or more UAVs that have actually traveled the total distance in prior flight plans, and based off an analysis of the health of batteries included in each UAV combined with the total charge of the batteries, determine that the one or more UAVs are likely to be able to travel the total distance. The UAVs that are likely able to travel the total distance are presented via the user interface for use to conduct the flight plan. Additionally, the flight planning system 100 can determine one or more human operators that have licenses, certifications, or have been involved in prior flight plans, that are beneficial or necessary to perform a current flight plan.

To determine risk information, the flight planning system 100 includes an analysis engine 120 that can determine performance characteristics of information included in one or more databases, e.g., databases 102-108. As described above, performance characteristics can include any information that can inform, or affect, a safe, or functional, UAV flight plan. Optionally, the information stored in the databases 102-108 can be associated with metadata describing a context of the stored information, e.g., a database storing information identifying a particular component (e.g., a unique serial number) can be associated with metadata describing UAVs it was included in (e.g., unique UAV serial numbers), and so on.

The analysis engine 120 is in communication with an operator database 102. The operator database 102 can store operator information describing one or more UAV operators. The operator information can include a name and/or other identifier of each operator. Additionally, the operator database 102 can store some or all of the following: a number of hours flown by each operator (e.g., in a selectable period of time, or across his/her entire career), a number of hours flown by each operator for a given type of UAV (e.g., single rotor UAV, multi-rotor copter UAV, fixed wing UAV, jet UAV, UAVs larger than a first size, UAVs larger than a second size, etc.), trainings completed and credentials or licenses obtained (e.g., an instrument rating under the Instrument Flight Rules, particular class of airman medical certificate, operator proficiency events, an FAA UAV operator certificate, and so on), simulation flight time of the operator, and so on.

Along with information identifying operators, the operator database 102 can map each operator to specific UAVs, models of UAVs, or types of UAVs (e.g., propeller, rotor, jet, small, medium, large, military, civilian, reconnaissance, delivery, etc.) they have flown, or participated in a flight plan in a different capacity, e.g., as an observer.

The analysis engine 120 is in communication with an operational database 104. The operational database 104 can store flight information, and maintenance information, generated by particular UAVs during use, or manually described/entered by maintenance personnel. Flight and maintenance information can be obtained from one or more flight logs generated by UAVs (e.g., logs that identify continuously updating information including UAV location, and particular events including errors generated during flight). Flight logs can include error logs, logs describing flight actions, sensor reading logs, operator logs, and so on.

For instance, operational information can include information associated with an inertial measurement unit (e.g., acceleration, gyration, magnetic readings, and/or vibration analysis). Operational information can include attitude and/or altitude (e.g., determined from barometric readings, ground distance sensors, global positioning systems, etc.). Operational information can include velocity of the UAV, battery health tracking (e.g., voltage, current, temperature), and/or flight path (e.g., position, altitude, airspeed velocity, ground velocity, orientation). Operational information can include identifications of warnings and errors, configuration changes made in-flight to UAV components, execution of particular contingency plans, UAV state changes (e.g., on-ground, in-flight, landing), controller modes, and/or flight time. The operational information can include communication information (e.g., strength of signals received from outside communication systems including ground datalinks, data packet loss, transmission rates), thermal measurements (e.g., history of thermal cycles encountered, exceedance of thermal limits), and so on.

Optionally, the flight planning system 100 can connect (via a wired or wireless channel) to a UAV, obtain operational information from the UAV, and store the information in the operational database 104, e.g., with associated metadata identifying the UAV. Optionally, the analysis engine 120 can obtain operational information inputted, e.g., into a system in communication with the flight planning system 100, by maintenance personnel. The operational information can include written information describing the UAV, which the analysis engine 120 can obtain and parse to identify UAV operational information.

The analysis engine 120 is in communication with a UAV configuration database 106. The UAV configuration database 106 stores information describing components (e.g., hardware and software) included in particular UAVs, and actions that users (e.g., operators) took while operating the particular UAVs. A UAV may have a unique identifier such as a UID, or a vehicle number assigned by a governmental authority (such as the Federal Aviation Administration).

For instance, the UAV configuration database 106 can store information identifying specific hardware in use (e.g., serial numbers, types of hardware, physical configuration of the hardware, flight hours which can be similar to a HOBBS meter, and batteries used including the number of charge/discharge cycles undergone). The UAV configuration database 106 can store one or more versions of software included in the UAV, including any issuer-recoverable methods to sign safety-critical hardware and software (e.g., identifying the hardware or software as Certified, Trusted, or neither). The UAV configuration database 106 can store standard operation procedures of the UAV, total system weight or weight of particular hardware, and/or software configuration information (e.g., calibration data, configuration settings such as modes of operation).

The analysis engine 120 is in communication with a UAV mission information database 108. The UAV mission information database 108 stores information generated during missions of particular UAVs, including data generated by flight critical modules (e.g., datalink information, global positioning system information), payload modules included in the UAVs (e.g., cameras, sensors), and/or modules included outside of the UAV (e.g., ground sensors).

The UAV mission information database 108 can store video, still images, signals intelligence, range measurements, electromagnetic measurements, determined atmospheric pressure, gravitational measurements, radar measurements, data transmitted to or from the UAV, radio frequency identification (RFID) readings, atmospheric composition, gas type readings, meteorological measurements, sunlight radiance, data on physical substances (e.g., transported, received, captured, dropped), data on physical packages (e.g., transported, received, captured, dropped), and so on. The UAV mission information database 108 can associate the stored information with metadata, including timestamps, tags, notes, geotags, aircraft state information, and/or sensor states.

The analysis engine 120 can obtain information from the databases 102-108, and generate performance characteristics related to the operation of UAVs. The databases 102-108 can optionally be associated with each other, to link information from one database to a different database. In this way, the analysis engine 120 can obtain, for example, each component that was ever included in a particular UAV, or each component that experienced an error that was ever included in a particular UAV. Optionally, the databases 102-108 may be combined into fewer databases or configured as a larger number of databases.

By way of illustrative example, the analysis engine 120 can determine the battery health of batteries included in a particular UAV. The analysis engine 120 can obtain voltage, current draw, temperature information, and/or number of charge cycles undergone of batteries included in the particular UAV over a period of time (e.g., a most recent flight plan, or flight plans of a selectable period of time). The analysis engine 120 can then determine an estimate of the health of the batteries, which the analysis engine 120 can utilize to inform a determination regarding maximum UAV flight power (e.g., maximum power that can be extracted from the batteries), endurance (e.g., longevity of the batteries), maximum distance the UAV can travel, and probability of failure (e.g., likelihood that the batteries will fail). The analysis engine 120 can effect these determinations with information identifying average estimated charge/recycle cycles available to the battery, and so on.

The analysis engine 120 can perform a vehicle vibration analysis, to determine whether issues with the UAV airframe exist. The non-exhaustive example list of issues includes, unbalanced propellers or rotors spinning, structural modes of the UAV aircraft, loose structural elements, controller induced modes (e.g., control surfaces moving in such a way as to cause vibrations in the UAV aircraft as a result of following instructors from the controller), issues with the inertial measurement sensors, and so on. The analysis engine 120 may identify additional, fewer, or different UAV airframe issues.

The analysis engine 120 can then generate a vibration profile of specific UAVs (e.g., the analysis engine 120 can run simulations using the UAV aircraft or airframe type or the specific UAV model, and sensor information including acceleration, gyration, magnetometer, and other sensor data). The analysis engine 120 can track particular UAVs over a period of time, to identify any changes in vibration profiles. The analysis engine 120 can utilize the changes to determine possible causal factors. For example, if the vibration profiles shows an increase in vibrations above a certain airspeed, the analysis engine 120 can determine that there is a probability that the aircraft is exciting a structural mode. Optionally, the analysis engine 120 can associate a particular UAV with UAVs that include similar components and/or are of a similar UAV airframe or model type. In this way, the analysis engine 120 can determine that a particular UAV might exhibit vibration characteristics similar to other UAVs.

The analysis engine 120 can determine whether breach of flight authorizations occurred. A flight authorization can identify specific flight paths, geofences, airspaces, speed, weight, maneuvers, and/or flight duration at a given location, of a UAV. Thus, the analysis engine 120 can determine violations of constraints and restrictions identified in a flight authorization for a particular UAV, e.g., from locations of the UAV, operator actions, airspeeds of the UAV, weights of components included in the UAV, and so on. Additionally, the analysis engine 120 can determine whether operator actions caused a breach of a flight authorization, and use this determination to inform a risk assessment of the operator.

Furthermore, the analysis engine 120 can aggregate performance characteristics, to identify performance characteristics associated with specific components, or types of components, included in multiple UAVs, performance characteristics of specific operators, classes of UAVs, models of UAVs, types of UAV airframes, and operating environments (e.g., temperature, humidity, wind velocity, or other weather related parameters) experienced by UAVs. As an example of operating environments, the analysis engine 120 can determine that particular components are degraded (e.g., corroded) after being in heavy rain or operating above a certain air temperature for more than a certain threshold of time. To effect this determination, the analysis engine 120 can obtain maintenance information after UAV flights, and determine that the weather is associated with the damage.

In addition to the above, the analysis engine 120 can determine summarizing performance characteristics, including flight totals and flight times of specific UAVs, specific components, and/or operators. The analysis engine 120 can determine a measure of central tendency (e.g., mean, median, mode, geometric mean, harmonic mean, weighted mean, truncated mean, midrange mean, trimean, winsorized mean, etc.) between failures of UAVs, specific components, and operators. As described above, the analysis engine 120 can determine performance degradation of specific components, e.g., batteries, and of a UAV (e.g., from performance degradation of components included in the UAV, and performance degradation of the UAV airframe).

Generating Flight Requests

The flight planning system 100 optionally includes a report generation engine 130 that can generate flight requests 132 to be provided to an entity (e.g., a regulatory agency, an insurance entity, and so on) for approval. A flight request 132 is a description of a flight plan packaged to be readable by a reviewing user (e.g., employed by the entity 136). The user of the user device 112 can specify a particular entity, such as a particular regulatory agency, or particular insurance organization, and the report generation engine 112 can package the described flight plan in a format specified and/or utilized by the specified entity. For instance, the report generation engine 130 can generate an authorization request report 122 with information for an FAA Certificate of Authorization. The report generation engine 122 can obtain information identifying types of information to include in the requested report 122, and generate the report 122 by filling in the respective types of information.

Additionally, since the flight planning system 100 optionally includes an analysis engine 120, as described above, the report generation engine 130 can include relevant risk information required by the entity 136. For instance, the report generation engine 130 can include information describing an operator assigned to the flight plan (e.g., certifications obtained, hours flown, and so on), capabilities of the assigned UAV (e.g., contingency plans, type of aircraft, quantity of fuel such as total battery charge, amp-hours, and a measure of the health of the battery as described above).

The flight planning system 100 optionally includes a permission control engine 140, which can receive approval of a provided flight request 132, and constraints 138 from information included in the approval. For instance, the entity 136 can require that the UAV to be flown in the flight plan is to be constrained to a smaller geofence boundary. The permission control engine 140 can modify the flight plan to update the geofence boundary to the constrained geofence boundary. Similarly, the entity 136 can determine that the UAV is to fly at a lower altitude, is to transition between waypoints at a slower transition speed, and so on.

FIG. 2 illustrates an example user interface 200 to indicate flight planning information. The user interface 200 is an example of an interactive user interface, generated by a system (e.g., the flight planning system 100, or a presentation system in communication with the flight planning system 100) that can receive user interactions, access one or more databases, and update the user interface 200 in response to received user interactions. The user interface 200 can be a document (e.g., an interactive document such as a web page), presented on a user device (e.g., a computer, a laptop, a tablet, a smart phone, other mobile device, etc.) for presentation to a user.

The user interface 200 includes imagery 202 (e.g., satellite imagery as depicted) of a location entered by the user of the user interface 200. The imagery 202 included in the user interface 200 can be interactive, and the user can zoom in and out of the image 202 to obtain a greater or smaller real-world area. For instance, the user can interact with a zoom control, or the user can utilize a touch screen to zoom in and out (e.g., the user can pinch to zoom).

The user interface 200 enables the user to select areas on the imagery that define the highlighted shape (e.g., the user can select particular corners of the illustrated polygon, such as 204A-E), and the system can shade, or otherwise highlight, the internal portion of the shape. Additionally, the user interface 200 enables the user to select a particular corner of the illustrated polygon (e.g., 204A), and drag the shape into existence by moving a finger or stylus on a touch sensitive screen of the user device.

A flight path 206 for the UAV may be generated with a take-off and landing location 210. The interface may include a menu 208 to create different representative layers of the job. For example, menu 208 identifies layers associated with a flight data package that includes a geofence, survey area (e.g., "Photosurvey Area"), take-off and landing locations (e.g., "Launch/Land Area"), and the presented imagery 202 (e.g. "Base Map"). The geofence menu item refers to the geofence as represented by the connected vertices 204A-204E. The survey area menu item represents the flight path 206. The launch/land area menu item represent the launch/land areas 210. And the base map layers represents the base image layer 202. Upon selection of a layer, the associated layer can be removed from the user interface (e.g., upon selection of the survey area layer, the survey area shading can be removed).

As illustrated in FIG. 2, the imagery 202 includes a highlighted area that defines a geofence boundary to be enforced by a UAV when implementing a flight plan. Different types of geofences may be used by the UAV during flight operations. A geofence is a two-dimensional or three-dimension location-based boundary, and can be understood as a virtual perimeter for a geographic location. A geofence boundary can be represented on a map as polygonal shapes, for example a circle, rectangle, sphere, cylinder, or other shape. A geofence may also be time-based (four-dimensional) where the geofence exists for a particular duration, for example, a number of hours or days, or for a specific time period, for example, from 2:00 p.m. to 4 p.m. occurring on certain days, or other periods of time. A user of the user interface 200 can interact with the user interface to further define time-based information. A three-dimensional geofence may exist in a particular space above ground. A geofence may be represented by latitudinal and longitudinal connected points, or other coordinate systems. A geofence may be created such that the geofence has dynamic aspects to it where the geofence may increase or decrease in size based on various conditions. For UAV flight operations, geofence structures can be received by the UAV and stored in non-volatile memory.

Optionally, the system can utilize property information, such as property boundaries, and automatically include a highlighted portion of the imagery 202 as being a possible flight boundary geofence. For instance, as illustrated in FIG. 2, the flight boundary geofence abuts a road included in the real-world geographic area depicted in the imagery 202. The system can determine that the entered location information describes a particular property (e.g., an open clearing that borders the road), and can highlight the particular property. Optionally, the system can include a buffer from the property boundaries of the location to ensure that even with a strong gust of wind, the UAV will remain within the property boundaries.

Optionally, the user interface 200 can be utilized by a user to indicate waypoints to be traveled to during the flight plan. For instance, the user can select portions of the imagery 202 to designate as waypoints, and the user interface 200 can be updated to present selectable options associated with each waypoint. As an example, the user can designate an order that each waypoint is to be traveled to, actions the UAV is to take at the waypoint, a transition speed between each or all waypoints, and so on. The system can determine the flight boundary geofence from the waypoints, such that the geofence perimeter encompasses the waypoints. The determined flight boundary geofence can be presented to the user for review, and the user can modify the boundary by interacting with the user interface 200.

Additionally, the user interface 200 can include text provided by the user that describes the flight plan. A different user can access the user interface 200, and quickly view the determined flight boundary geofence along with text describing the flight plan. In this way, a user can quickly describe flight plan information sufficient for a UAV to implement, and other users can quickly view graphical representations of the flight plan (e.g., graphical representation of the flight boundary geofence along with textual data describing the flight plan).

Additionally, the user interface 200 can include text provided by the user that describes the flight plan. A different user can access the user interface 200, and quickly view the determined geofence envelope along with text describing the flight plan. In this way, a user can quickly describe flight plan information sufficient for a UAV to implement, and other users can quickly view graphical representations of the flight plan (e.g., graphical representation of the geofence boundary along with textual data describing the flight plan).

Figure 3:
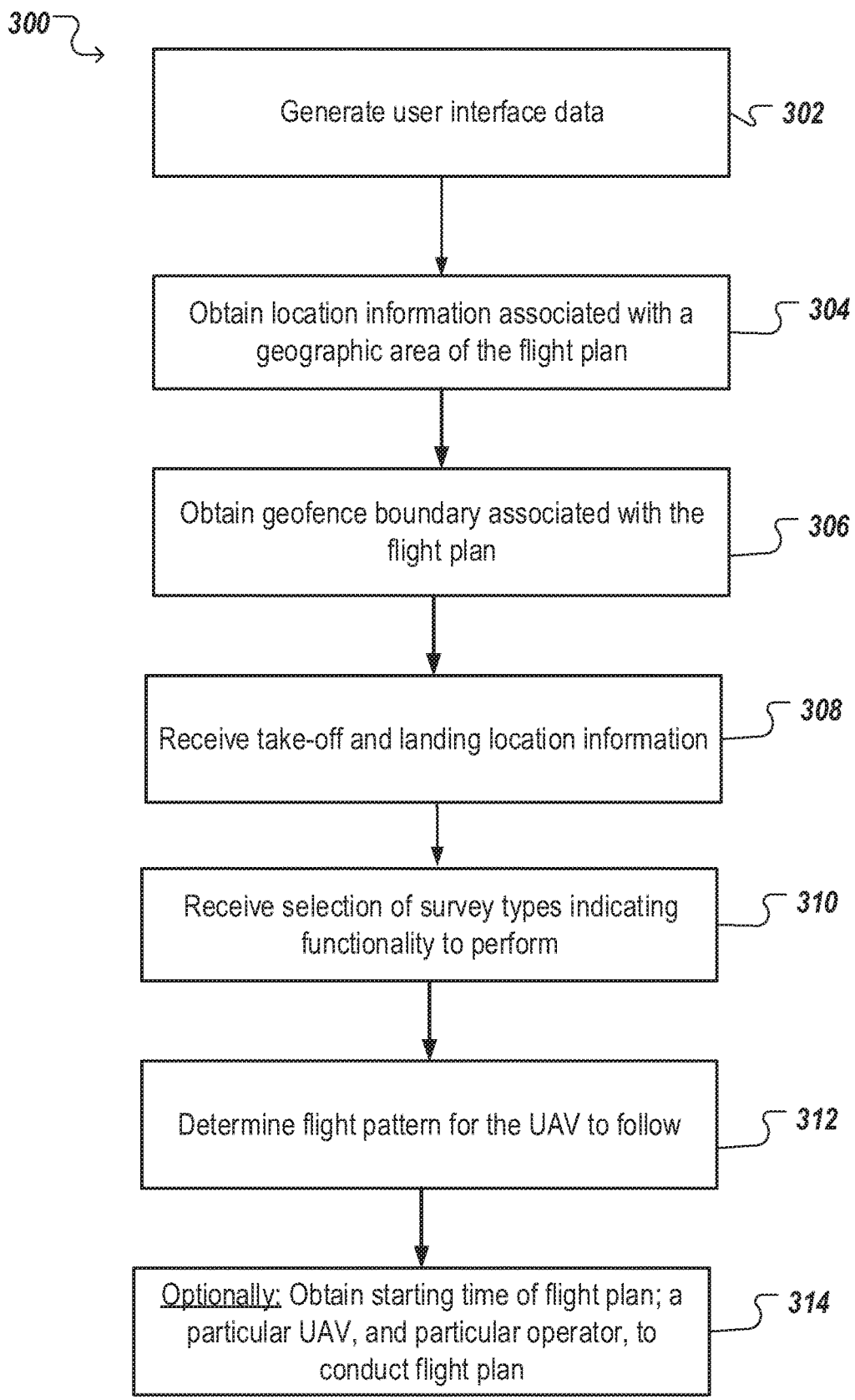
FIG. 3 illustrates an example process for determining a flight plan.

FIG. 3 illustrates an example process 300 for determining a flight plan. For convenience, the process 300 will be described as being performed by a system of one or more computers (e.g., the flight planning system 100).

The system generates user interface data for presentation on a user device in communication with the system (block 302). As described above, the system can generate user interfaces for presentation on a user device of a user that enable the user to enter information associated with a flight plan. As an example of a flight plan, a severe weather event can cause a user of the user device (e.g., an employee of an insurance company) to want to quickly inspect properties included in affected areas. The system can receive a request from the user regarding determining a flight plan, and can provide user interfaces (e.g., one or more web pages) for presentation on the user device of the user.

The system can store templates of user interfaces associated with one or more steps in a process to determine sufficient information describing the flight plan. The templates may assist a user to proceed through a workflow to create the flight plan and obtain necessary approvals. The user can provide relevant information, and the system can combine the received information into a coherent flight plan capable of being implemented by a UAV, optionally in conjunction with an operator utilizing a user device.

The system obtains location information associated with a real-world geographic area in which the flight plan is to occur (block 304). The system receives location information, which can include one or more addresses (e.g., property addresses associated with property to be inspected), global positioning system (GPS) coordinates (e.g., latitude, longitude), and/or a name associated with a geographic area (e.g., a city name, a neighborhood name, a name of a business, and so on). Optionally, the user can provide location information, and the system can obtain geo-rectified imagery (e.g., satellite imagery, map imagery) associated with the location information for presentation on the user device. For instance, the system can provide the location information to an outside system (e.g., a search engine that maintains geo-rectified imagery), and can receive imagery. The user can then select a portion of the obtained imagery and the system can determine real-world location information corresponding to the selected portion.

The system obtains a geofence boundary associated with the flight plan (block 306). As illustrated in FIG. 2, the system can present imagery associated with the obtained location information (e.g., a home, a structure, a farm, and so on) in an interactive user interface. The user can utilize the interactive user interface to indicate a geofence boundary.

Additionally, for location information associated with a property, the system can obtain property boundary information for the property (e.g., from commercial, or governmental, databases or systems). The system can then determine that the geofence boundary for the flight plan is the property boundary, or is a threshold distance less than the property boundary (e.g., a buffer can be included adjacent to the property boundary to ensure that a UAV does not accidentally cross into an adjacent property). Optionally, for situations in which the system cannot obtain property boundary information, the system can determine boundaries from obtained imagery of the property. For instance, the system can utilize computer vision techniques to identify the boundaries (e.g., the system can identify features associated with a boundary such as a fence, a road, a river, and so on).

Optionally, the system can enforce a maximum number of vertices of a polygon that encompasses a geofence boundary. For instance, the system can inform the user that a geofence boundary the user indicated exceeds a threshold number of vertices, and the user can update the geofence boundary. In this way, the system can ensure that the geofence boundary is not unduly complex with regards to a UAV maneuvering near the borders, which can cause problems for the UAV implementing the flight plan. Additionally, optionally the system can ensure that the indicated geofence boundary is convex and not concave.

After the geofence boundary has been indicated (e.g., by the user, or from property boundaries), the system stores real-world location information describing the boundary. For instance, the system can store GPS coordinates associated with corners of a polygon describing the geofence boundary. As described above, optionally the geofence boundary can be convex with a maximum number of corners. Utilizing these constraints, the system can generate a geofence boundary from just the GPS coordinates associated with the corners, enabling the UAV to conserve storage space by not storing more complex location information. In another instance, the system can store more complex location information, including locations on the geofence boundary and information describing curves connecting each location. In this way, the geofence boundary can be more complex than substantially straight lines between locations. In another instance, the system can store sufficient GPS coordinates describing the geofence boundary to enable the geofence boundary to take any shape and avoid more complicated processing as indicated above.

The system receives an indication of a survey area included in the geofence boundary. As described above, the geofence boundary limits allowable locations of a UAV to within the geofence boundary (e.g., a 2D area or 3D volume of space). The user can describe a particular survey area at which a UAV will be traversing and performing actions (e.g., obtaining real-world information such as images, heat data, and so on). Therefore, the survey area describes a real-world geographic area in which the functionality, specific actions, and usefulness of the flight plan is to be performed. As will be described, the user can indicate safe take-off and landing locations for a UAV, along with waypoints for the UAV to travel to, which can all be included in the survey area safely within the bounds of the geofence boundary. Flight waypoints may be generated by the system or by the ground control system. Based on the survey type, flight waypoints may be created to efficiently fly over the survey area while maximizing data collecting, and minimizing overall flight time.

As an example of a survey area, for a flight plan to inspect a rooftop of a property, the system can determine the survey area as being the boundaries of the rooftop. Additionally, for a flight plan to inspect a property, such as a home or business, the system can determine boundaries of the home or business as being the survey area, even if the property line boundary encompasses a greater area or volume.

The system receives take-off and landing locations (block 308). The system receives location information identifying a take-off location for the initiation of the flight plan, and location information identifying a landing location for the completion of the flight plan. Additionally, the system can receive landing locations associated with contingency plans. That is, the user can designate locations in the real-world as being safe for a UAV to perform an emergency landing if the UAV cannot reach the take-off or landing location.

The system can provide (e.g., in an interactive user interface) imagery (e.g., geo-rectified satellite imagery) of the real-world geographic area in which the flight plan is to be performed (e.g., the survey area as described above). The user can interact with the received imagery to designate a take-off location, a landing location, and optionally contingency locations. The system can receive the designated locations, and store the locations (e.g., latitude and longitude coordinates).

As described above, the system can automatically determine take-off and landing locations from features included in the imagery that are known to be free of obstructions and/or relatively flat. For instance, driveways can be identified in the imagery, large patios (e.g., the system can determine a centroid of the large patio), basketball or tennis area, and so on. The system can highlight (e.g., shade) these determined locations for presentation to the user, and the user can accept the locations, or modify them.

The system receives a selection of one or more survey types indicating functionality a UAV is to perform during the flight plan (block 310). The system presents selectable options for presentation to the user indicating functionality that a UAV can perform. Furthermore, the selectable options can be based off functionality the user has access to (e.g., the user can have paid for a portion of the overall survey types available). Additionally, the selectable options can be based off types of UAVs the user has access to (e.g., fixed-wing UAVs can perform a portion of the overall survey types available). Similarly, the user can request additional survey types, and the system can search an application store for functionality that comports with the user's request. For instance, the user can desire to perform an inspection of a nuclear tower, and the user can request an application (e.g., an application created by an outside entity) that when loaded onto a UAV, can effect an inspection of a nuclear tower.

As an example of a survey type, the user can select an inspection of a rooftop of a property (e.g., a home). The system can store information associated with the survey type, and during a resulting flight plan being implemented by a UAV, the UAV can execute functionality to perform the rooftop inspection (e.g., obtain images of the rooftop and identify damage, upon identification of a damaged area descend towards the damaged area capturing detailed images of the damaged area). As another example of a survey type, the user can select a vertical inspection of a structure. During a resulting flight plan being implemented by a UAV, the UAV can executed functionality to perform the vertical inspection (e.g., travel at a safe distance above the structure that is free of obstructions, descend in a vertical line towards the ground capturing imagery of the structure, ascend back to the safe distance, and travel to another location surrounding the structure to capture imagery).

The system can also determine, or receive, information identifying a ground sampling distance (GSD) indicating a minimum number of pixels (e.g., image pixels) per distance (e.g., 1 meter) that are acceptable to the user. The GSD can be utilized, for example, during a survey type associated with performing a rooftop inspection. As described above, a damaged area can be identified, and a UAV can descend towards the damaged area to capture detailed images of the damaged area. The UAV can descend until reaching the GSD, at which distance the obtained images are acceptably detailed. The GSD therefore can define a threshold distance above the rooftop at which the UAV does not need to travel below.

The system determines a flight pattern for a UAV to follow (block 312). Upon receipt of the survey type, the system can receive one or more waypoints associated with the survey type. For instance, a survey type associated with a vertical inspection can require waypoints all within a threshold distance of the structure being inspected that surround the structure. Given the waypoints, the system can determine a flight pattern for the vertical inspection (e.g., a UAV can ascend/descend in a vertical line at each waypoint, and travel to subsequent waypoints at a particular altitude known to be free of obstructions). Therefore, the system determines a flight pattern based off a selected survey type, and requests information from the user sufficient to determine the flight pattern (e.g., waypoint locations, particular altitude, and so on). The flight pattern may be based on the type of sensor that be used by the UAV. For example, the pattern may be adjusted based on the field of view, the height of the survey, etc.

The system receives or determines location information associated with waypoints at which a UAV is to perform respective actions. The location information can include GPS coordinates (e.g., latitude and longitude), and optionally a designation of a particular altitude (e.g., AGL or MSL altitudes) at which an action is to occur. The user can interact with presented imagery (e.g., as illustrated in FIG. 2), and select waypoints along with information including a designation of an importance of the waypoint (e.g., a rank of the waypoint), an order of the waypoint, and so on. The user can further define an action associated with each waypoint, such as activation of one or more sensors, or other payload modules.

The system can optionally receive waypoint transition speeds indicating a speed at which a UAV is to travel between waypoints. Alternatively, the waypoint transition speed may be a default value (e.g., the default value can be determined at flight time based off capabilities of a UAV), such as 1.5 meters per second, or a variable speed based on the distance of one waypoint to the next waypoint. For example, the waypoint transition speed, may be set to a higher speed for waypoints that are farther apart, and a lower speed for waypoint that are closer apart. Also, the waypoint transition speeds can be set as function of the useful battery life, or flight time of the UAV.

As described above, for particular survey types a GSD can be indicated by the user. When inspecting the rooftop of a property, the system can obtain information identifying a height of the property. Since the GSD informs a distance above a surface being imaged, the altitude that a UAV has to fly at to capture images at the GSD depends on the height of the rooftop. Therefore, the system can store information identifying an altitude at which a UAV needs to descend to (e.g., from a safe altitude as described above) to capture imagery at the GSD. The UAV can optionally utilize distance sensors, such as Lidar, to actively determine a distance over the surface.

Additionally, the system can receive, via an interface, information describing flight plan contingencies. A flight plan contingency instructs a UAV to perform an action or operation based on certain contingency criteria. For example, contingency criteria may be the detection of a low battery or fuel state, or malfunctioning of an onboard sensor, motor, other component, or a deviation from the flight plan, or crossing over a geofence boundary by the UAV. Other contingency events may include ground control system (e.g., user device of an operator) power or system failure, lost or degraded telemetry link to/from the UAV and ground control system, stuck motor, GPS failure or degradation, autopilot sensor failure (e.g., airspeed, barometer, magnetometer, IMU), control surface failure, gear failure, parachute deployment failure, adverse weather conditions, nearby aircraft in airspace, vehicle vibration, aircraft fly-away). The user can designate particular actions associated with each contingency, for instance upon detection that fuel is below a threshold, the contingency flight plan can be to return to a landing location. Similarly, a contingency associated with GPS failure can result in the UAV hovering until a GPS lock is obtained. The system may also select predetermined contingencies for the flight plan. For example, the flight plan may include a contingency rule that if there is a lost telemetry link for a certain period of time, the UAV is instructed to return back to its starting location. Also different contingency events, and UAV responses, may be selected particular survey types. For example a roof-top inspection may a different response to the same contingency event, that a cellular tower inspection. For example, in the case of a cellular tower inspection, the UAV may be instructed to hold position in the case of GPS failure so that the operator may take over control of the UAV in manual mode. In the case of a roof-top inspection, GPS failure, the UAV may automatically ascend to an altitude to try to re-establish a GPS lock.

The system receives a starting date and time of the flight plan, and optionally a particular operator and UAV to conduct the flight plan using risk assessment information (block 314).

The system can optionally receive, via a user interface, a starting time of the flight plan, or a particular range of times that the user would prefer. Optionally, the system can determine an optimum starting time (or range of starting times) of the flight plan (e.g., from weather information). The system can provide recommendations regarding starting times for presentation to the user, and the user can select from among the recommendations, or utilize an entered time. The system may provide a window of time for the flight plan to be conducted. A UAV receiving the flight plan may only conduct a mission within the flight window. The UAV computer system may determine that based on the then UAV current time, that the UAV may conduct the flight plan, or may not conduct the flight plan because the UAV is not within the flight window, or that the UAV cannot complete the flight plan within the flight window because the overall flight time would continue past the end of the flight window.

As an example of utilizing weather information, the system can determine whether the weather will negatively affect the flight plan. For instance, the system can determine that weather at the received starting time is projected to be cloudy, rainy, and so on (e.g., based on information obtained via a digital weather data feed or database), and that one or more of the sensors, or payload modules, included in the UAV will be negatively affected, or that the flying conditions will be unsafe. Furthermore, the system can determine locations of the sun during the flight plan (e.g., based on information obtained via a sun position database or via a program that calculates the position of the sun on at various points in time), and based on the locations, can determine whether the sun will be pointed at the one or more of the sensors of the UAV (e.g., the bright light of the sun can cause clipping in the image) based on the start time of the inspection and particulars of the flight plan (e.g., waypoints and actions associated with waypoints). The system can recommend alternate times, or as will be described below, recommend a particular UAV to perform the inspection (e.g., a UAV with filters to reduce bright light).

As described above (e.g., in FIG. 1), the system can analyze the described flight plan, and through analyses of risk information associated with UAVs available to be used by the user, can determine recommendations to the user of particular UAVs that should be utilized. For instance, by monitoring the health of batteries included in each available UAV (e.g., available at the starting time selected by the user), the system can determine whether a UAV can likely effect the flight plan, including traveling to each waypoint and safely landing with a fuel level or battery charge greater than a required threshold amount. In a situation in which the system does not determine any UAVs, the system can provide a recommendation that the user utilize a particular battery from another UAV, or that the user modify the starting time to a time at which a UAV is available with a suitable battery. Additionally, for flight plans associated with locations in densely populated areas require UAVs that pass minimum safety requirements, such as no more than a maximum number of hours (for example 1000 hrs on the airframe), or that the battery has less than a maximum number of hours of use. Similarly, the system can determine UAVs with components (e.g., flight critical components) that have been determined to not have degradation. Similarly, the system can determine UAVs with redundant components or that can be flown safely even if a given flight component (e.g., an engine, a propeller, etc.) fails. Alternatively, for flight plans that are not over densely populated areas (e.g., Map Ref 41° N 93° W), optionally the system can determine that a UAV can have a greater risk associated with its use, and be less stringent with recommendations.

Additionally, the system can present identifiers of operators with availability around the starting time. For instance, the system can include information describing each operator, such as information associated with experience level, instrument rating, certifications obtained, rates of mission failure that can be attributed to the operator, other operator information described herein, and so on. Similar to recommending UAVs, optionally the system can determine recommendations of operators for the flight plan. For instance, the system can determine a measure of central tendency (e.g., average) failure rate of flight plans that can be attributed to operator error (e.g., identifying a total number of flight plans that resulted in failure, and modifying the total number to remove flight plan failures attributed to UAV component failures, weather such as heavy rains, and so on). The system can then determine an available operator with a failure rate less than average, or less than the remaining available operators. For a flight plan over a densely populated area, the system can determine that an operator's risk information (e.g., failure rate) is less than a threshold, and if the risk information is greater than the threshold, the system can recommend alternative starting times.

Along with risk information, the system can determine configuration information of a UAV that is beneficial for the selected survey type (e.g., identifying a particular type of damage). For instance, to determine hail damage of a rooftop, the UAV can benefit from a heat sensor or thermal imager (e.g., older hail damage has higher heat loss than newer hail damage). Additionally, a given type of damage may benefit from an infra-red sensor, an ultra-violet sensor, a sensor that can measure radiation, a sensor that can detect chemical leaks, a camera with a longer focal length (e.g., enabling the UAV to take detailed images without getting too close to the property), and so on. The system can recommend that the user include the above sensor and payload modules specific to the flight plan. In addition, the system can monitor risk information associated with components, and recommend that the user utilize specific payload modules, or flight critical modules, that have been determined to not be degraded (e.g., swap out components included in a particular UAV).

Figure 4:
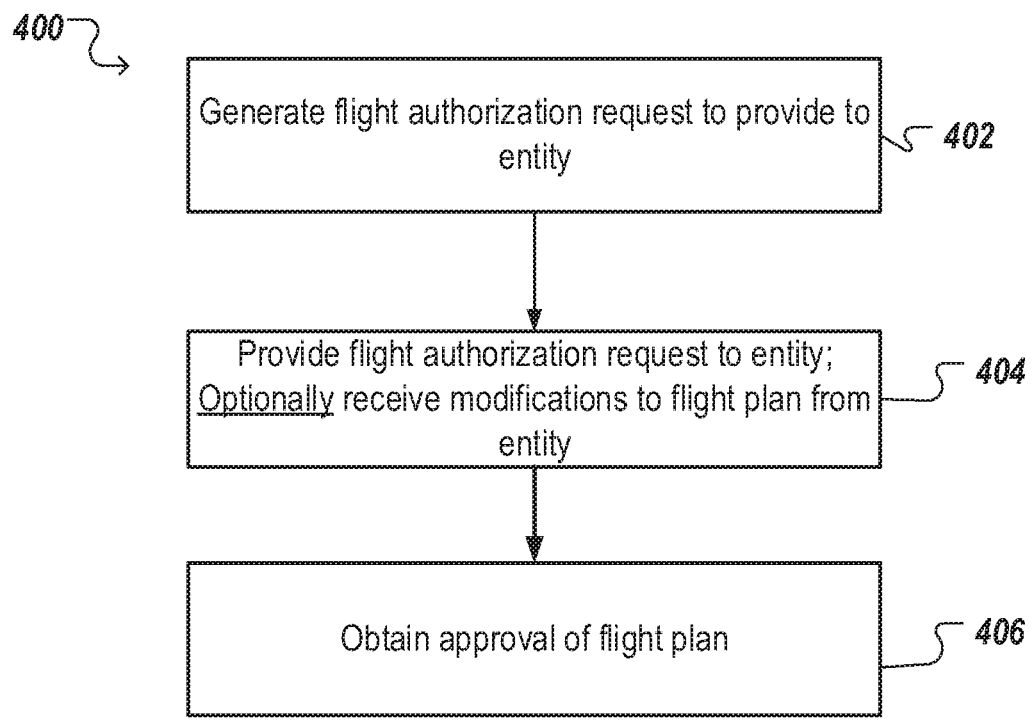
FIG. 4 is a flowchart of an example process for approval of a flight plan.

FIG. 4 is a flowchart of an example process 400 for approval of a flight plan. For convenience, the process 400 will be described as being performed by a system of one or more computers (e.g., the flight planning system 100).

The system generates a flight authorization request to provide to an entity (block 402). The system can receive an indication of an approval entity, or insurance entity. For instance, the user can select (e.g., in an interactive user interface) a particular approval entity (e.g., the Federal Aviation Authority, the National Aeronautics and Space Administration), or the user can select an insurance entity to underwrite the flight plan. After receiving a selection of an entity, the system can obtain information describing flight information that the entity is known to request, along with a particular format preferred by the entity. The system generates a flight authorization request that packages the flight plan in conformance with the particular format associated with the entity. For instance, the system can store boiler plate text (e.g., "The flight plan begins at location [$INSERT SAFE TAKE-OFF LOCATION"), which the system can utilize to include relevant flight plan information. Various information about the UAV and flight plan as follows may be provided, but is not limited to, the name of the requestor, the vehicle identifier, the vehicle type, vehicle owner, the number of hours on the airframe, battery use information, the selected operator/pilot of the vehicle, the flight way points, the particular time of flight, whether visual line of sight (or requesting non-visual line of sight operation), any special requests.

The system provides the flight authorization request to the entity and optionally receives modifications to the flight plan (block 404). The system can maintain address information (e.g., an e-mail address, a physical address) to be utilized when providing the flight authorization request report. Optionally, for an entity that has an associated application programming interface (API) that can be utilized to provide flight authorization requests, the system can provide the flight authorization request using one or more API calls.

Optionally, the system can receive modifications to the flight plan after the flight plan is provided (e.g., constraints associated with the flight plan). For instance, the approving entity can recommend or require that the flight plan be modified in order to receive a lower insurance premium and/or deductible, or receive approval of the flight plan. The system can receive updates to any aspect of the flight plan, including a starting location, a landing location, contingency plans, waypoint information, and so on. As an example, the entity can modify the flight plan to reduce an altitude at which the UAV is to travel, or modify a geofence boundary to remove a particular area from allowable locations (e.g., locations over a sensitive environmental area). As another example, the entity can modify a waypoint transition speed to reduce the velocity of the UAV.

The system can receive the modifications, and parse the modifications to obtain relevant updates to the flight plan. For situations in which an entity provides modifications to a flight plan in a known format (e.g., document of a known format), the system can parse the received modifications and identify aspects that have been modified according to the format. The system can then update the flight plan accordingly, and provide to the user for confirmation. For situations in which an entity does not provide modifications to a flight plan in a known format, the system can analyze the received modifications (e.g., text describing modifications that need to be made), and can update the flight plan accordingly (e.g., the system can identify language such as "altitude needs to be lowered to 30 meters), and update the altitude to 30 meters. The system can then provide the modifications to the user for confirmation. After modifying the flight plan, the system can provide the modified flight plan for an additional review by the entity.

The system obtains approval of the flight plan (block 406). The system receives confirmation from the entity allowing the flight plan to commence. As will be described below, the system can then provide an electronic flight data package identifying the approved flight plan to a UAV, and optionally to a user device of an operator. A received electronic flight data package may be digitally signed (encrypted using public/private keys, or some other method), such that if there is any subsequent modification of the flight plan, the UAV will not conduct the mission.

Optionally, the system may present via a user interface any changes made by the entity. A user of the system may then determine if the flight plan should be conducted. The approving entity may have lower an altitude for the flight plan. However, it may be that flight at the altitude is necessary to obtain desired sensor data, such as an image at the pre-planned altitude. In this case, the user may decide to cancel the flight plan due to the constraints placed on the flight. The system may notify the approving entity that the flight plan is cancelled. Also, the user may request another flight window where the altitude of the flight may be allowed.

Figure 5:
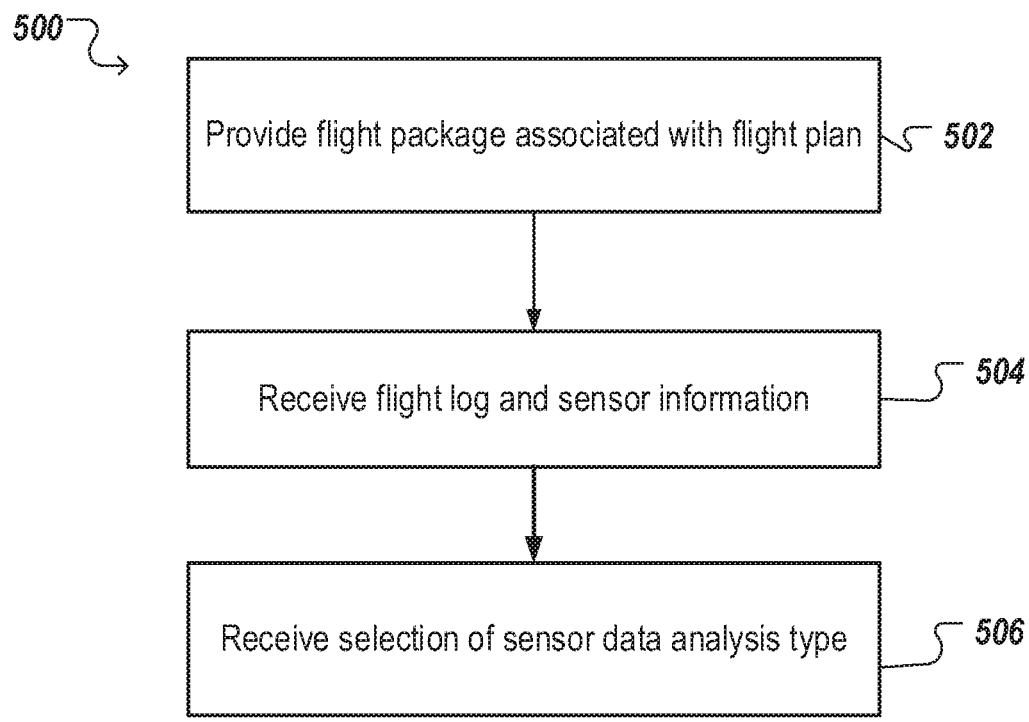
FIG. 5 illustrates an example process of processing information obtained subsequent to a flight plan being conducted.

FIG. 5 illustrates an example process 500 of processing information obtained subsequent to a flight plan being conducted. For convenience, the process 500 will be described as being performed by a system of one or more computers (e.g., the flight planning system 100).

The system provides a flight data package associated with the described flight plan (block 502). As described above, the flight plan can be conducted with a UAV and optionally in concert with a user device of an operator. For instance, when performing a rooftop inspection, the UAV can travel at a particular distance over the rooftop (e.g., 30 meters), and provide sensor information (e.g., images) of the rooftop at that distance to the user device of the operator. The operator can then select areas on the rooftop that appear to be damaged, and waypoints associated with each selection can be set and provided to the UAV. Subsequently, the UAV can travel to each waypoint and descend to a threshold distance above the rooftop capturing sensor information (e.g., descend to the ground sampling distance as described above in FIG. 3.).

Therefore, for some flight plans, both the user device of the operator and the UAV are required to have information associated with the flight plan. A user of the system can interact with the system to provide (e.g., transmit) a flight data package to each of the UAV and user device, or the system can automatically determine, based off the flight plan, that both the UAV and user device require the flight data package. Alternatively, the user can provide the flight data package to just the UAV. The system provides the flight data package to a UAV selected by the user (e.g., as described in FIG. 4), and the system can identify the selected UAV with an associated UUID, and can provide the flight data package over a wired or wireless connection. Optionally, the system can provide the flight data package to the user device, and the operator can provide the flight data package to the UAV after traveling to the take-off location.

After providing the flight data package to the user device and UAV, the system can receive an acknowledgement receipt verifying that the user device and UAV received the flight data package.

Optionally, the system can provide a cancellation of the flight data package to the user device and UAV. For instance, an entity (e.g., a regulatory agency) can indicate that the flight plan is to be canceled or modified. The system can provide a cancellation command to the user device and UAV, and the user device and UAV can respond verifying the acknowledgement.

Optionally, the user device or UAV may electronically communicate with an entity's computer system, and confirm that the flight plan is still viable. This confirmation may be performed, for example, within a window of time, before the flight is to be conducted. If UAV or user device receives an affirmative reply, the flight plan may be conducted, otherwise if the UAV or user device receives a negative reply, the UAV conducted the flight plan may be inhibited.

The system receives flight log and sensor information (block 504). After the flight plan has completed, or optionally during the flight plan, the system receives information associated with the flight plan including flog log data and sensor information. As described in FIG. 1, the system can maintain flight log data in one or more databases, and use the flight log data to inform risk assessments. Additionally, as will be described below, the flight log data can be utilized by the system in conjunction with sensor information (e.g., images obtained during the flight plan) to generate data analyses. The system can receive the flight log and sensor information directly from the UAV that conducted the flight plan, or from the user device of the operator. For instance, the user device can receive the information form the UAV over a wired or wireless connection (e.g., during the flight, or after the flight), and the user device can provide the information to the system for storage.

The system receives a selection of a sensor data analysis type and generates analyses (block 506). The system can utilize the sensor information and flight log data to combine (e.g., stitch together) the sensor information to generate an ortho-rectified mosaic, a 3D mesh, a 3D point cloud, a digital surface model, and so on, of the surveyed area associated with the flight plan. The system can utilize the flight log data to determine locations, times, attitude and altitude information, associated with the UAV activating one or more sensors to obtain sensor information, and correlate the data with sensor information (e.g., timestamps associated with the sensor information). The user can select a particular sensor data analysis type, and the system can utilize the flight log data and sensor information to generate the sensor data analysis type.

Additionally, the system can receive information to perform image analysis on the received sensor data. For instance, the system can identify damaged areas (e.g., using one or more visual classifiers), and perform any arbitrary analysis requested by the user.

The resulting sensor data analysis type, image analysis information, and so on, can be provided for presentation to the user. For instance, the user can receive a digital surface model of the survey area. Additionally, the sensor data analysis can be stored and utilized in further flight plans. For example, for a future flight plan, the user can obtain a digital surface model of a survey area, and indicate a geofence boundary describing a precise 3D volume, or the user can zoom through the digital surface model to precisely mark waypoints including altitude information, and so on.

Although in one embodiment of the invention, as described above, the system is primarily used to create and transmit a flight data package to a UAV or user device (e.g., ground control station), the UAV or user device can initiate the request for a flight data package from the system. That is, the UAV or user device (e.g., user of the user device) can arrive at a property location, and then request a flight data package, or an updated flight data package. For example, the UAV or user device can determine its geospatial position via a GNSS receiver (using GPS, GLONASS, Galileo, or Beidou system). The UAV or user device can then transmit its location information to the system, along with other identifying information about the requesting device, such as its UUID, or Mac address, etc. The system will then receive the request, and determine if an updated or changed flight data package exists by comparing the device identifier to a database storing the new or updated flight data package information. If a new or updated flight data package exists, then the flight data package will be transmitted from the system, and received by the UAV or user device. A confirmation acknowledging receipt of the flight data package may then be transmitted from the UAV or user device to the system. The system will then update the database that the particular flight data package has received. Moreover, the UAV or user device can supply the property location, and a new job request can be sent to the system. The system may create a new flight data package for the UAV or user device.

Figure 6:
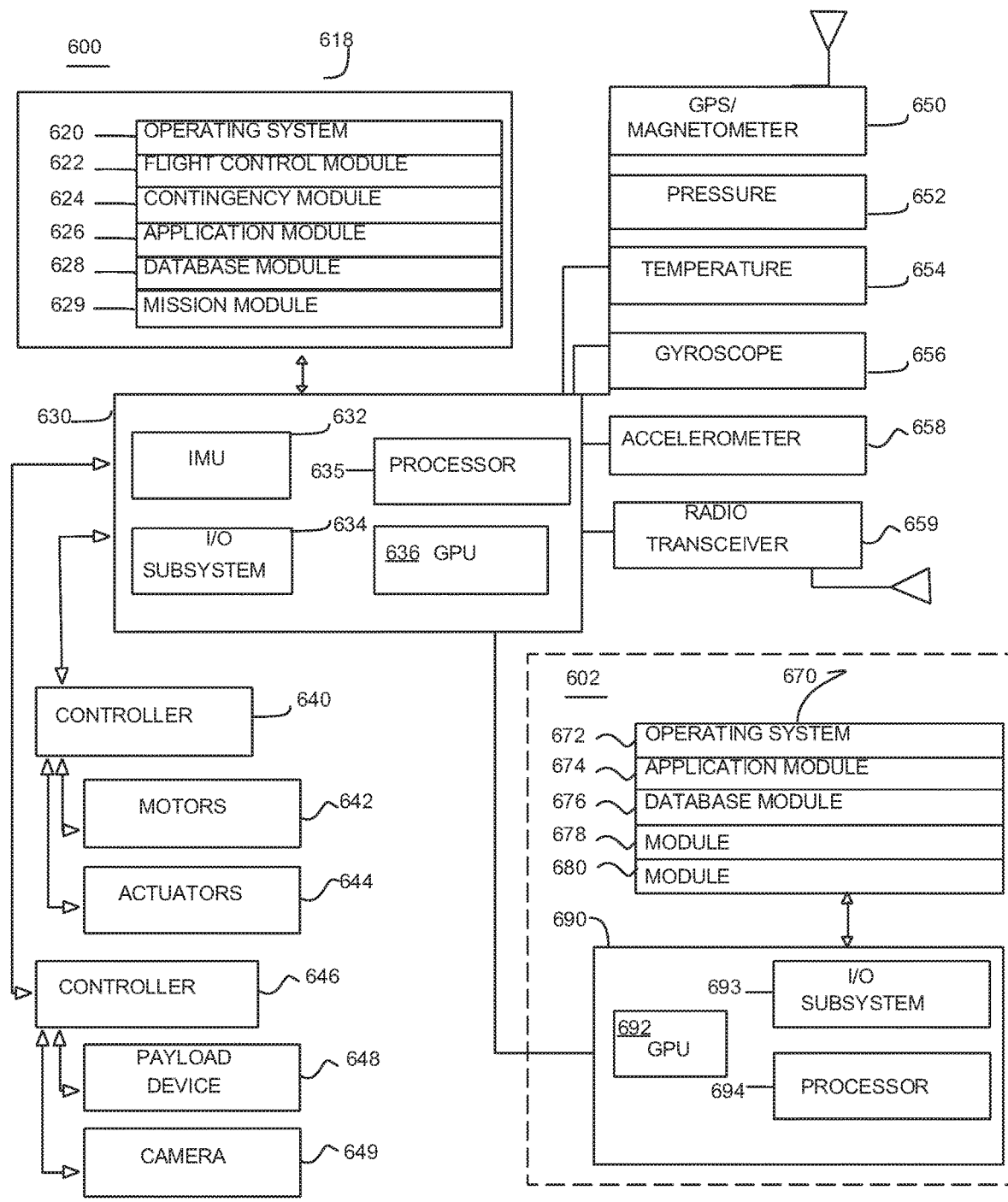
FIG. 6 illustrates a block diagram of an example flight control system architecture for an unmanned aerial vehicle (UAV).

FIG. 6 illustrates a block diagram of an example Unmanned Aerial Vehicle (UAV) architecture for implementing the features and processes described herein. A UAV primary processing system 600 can be a system of one or more computers, or software executing on a system of one or more computers, which is in communication with, or maintains, one or more databases. The UAV primary processing system 600 can be a system of one or more processors 635, graphics processors 636, I/O subsystem 634, logic circuits, analog circuits, associated volatile and/or non-volatile memory, associated input/output data ports, power ports, etc., and/or one or more software processing executing one or more processors or computers. Memory 618 may include non-volatile memory, such as one or more magnetic disk storage devices, solid state hard drives, or flash memory. Other volatile memory such a RAM, DRAM, SRAM may be used for temporary storage of data while the UAV is operational. Databases may store information describing UAV flight operations, flight plans, contingency events, geofence information, component information, and other information.

The UAV processing system may be coupled to one or more sensors, such as GPS receivers 650, gyroscopes 656, accelerometers 658, pressure sensors (static or differential) 652, current sensors, voltage sensors, magnetometer, hydrometer, and motor sensors. The UAV may use an inertial measurement unit (IMU) 632 for use in navigation of the UAV. Sensors can be coupled to the processing system, or to controller boards coupled to the UAV processing system. One or more communication buses, such as a CAN bus, or signal lines, may couple the various sensor and components.

Various sensors, devices, firmware and other systems may be interconnected to support multiple functions and operations of the UAV. For example, the UAV primary processing system 600 may use various sensors to determine the vehicle's current geo-spatial location, attitude, altitude, velocity, direction, pitch, roll, yaw and/or airspeed and to pilot the vehicle along a specified route and/or to a specified location and/or to control the vehicle's attitude, velocity, altitude, and/or airspeed (optionally even when not navigating the vehicle along a specific path or to a specific location).

The flight control module (also referred to as flight control engine) 622 handles flight control operations of the UAV. The module interacts with one or more controllers 640 that control operation of motors 642 and/or actuators 644. For example, the motors may be used for rotation of propellers, and the actuators may be used for flight surface control such as ailerons, rudders, flaps, landing gear, and parachute deployment.

The contingency module 624 monitors and handles contingency events. For example, the contingency module may detect that the UAV has crossed a border of a geofence, and then instruct the flight control module to return to a predetermined landing location. Other contingency criteria may be the detection of a low battery or fuel state, or malfunctioning of an onboard sensor, motor, or a deviation from the flight plan. The foregoing is not meant to be limiting, as other contingency events may be detected. In some instances, if equipped on the UAV, a parachute may be deployed if the motors or actuators fail.

The mission module 629 processes the flight plan, waypoints, and other associated information with the flight plan. The mission module 629 works in conjunction with the flight control module. For example, the mission module may send information concerning the flight plan to the flight control module, for example lat/long waypoints, altitude, flight velocity, so that the flight control module can autopilot the UAV.

The UAV may have various devices connected to it for data collection. For example, photographic camera 649, video cameras, infra-red camera, multispectral camera, and Lidar, radio transceiver, sonar, TCAS (traffic collision avoidance system). Data collected by the devices may be stored on the device collecting the data, or the data may be stored on non-volatile memory 618 of the UAV processing system 600.

The UAV processing system 600 may be coupled to various radios, and transmitters 659 for manual control of the UAV, and for wireless or wired data transmission to and from the UAV primary processing system 600, and optionally the UAV secondary processing system 602. The UAV may use one or more communications subsystems, such as a wireless communication or wired subsystem, to facilitate communication to and from the UAV. Wireless communication subsystems may include radio transceivers, and infra-red, optical ultrasonic, electromagnetic devices. Wired communication systems may include ports such as Ethernet, USB ports, serial ports, or other types of port to establish a wired connection to the UAV with other devices, such as a ground control system, cloud-based system, or other devices, for example a mobile phone, tablet, personal computer, display monitor, other network-enabled devices. The UAV may use a light-weight tethered wire to a ground control station for communication with the UAV. The tethered wire may be removably affixed to the UAV, for example via a magnetic coupler.

Flight data logs may be generated by reading various information from the UAV sensors and operating system and storing the information in non-volatile memory. The data logs may include a combination of various data, such as time, altitude, heading, ambient temperature, processor temperatures, pressure, battery level, fuel level, absolute or relative position, GPS coordinates, pitch, roll, yaw, ground speed, humidity level, velocity, acceleration, contingency information. This foregoing is not meant to be limiting, and other data may be captured and stored in the flight data logs. The flight data logs may be stored on a removable media and the media installed onto the ground control system. Alternatively, the data logs may be wirelessly transmitted to the ground control system or to the cloud system.

Modules, programs or instructions for performing flight operations, contingency maneuvers, and other functions may be performed with the operating system. In some implementations, the operating system 620 can be a real time operating system (RTOS), UNIX, LINUX, OS X, WINDOWS, ANDROID or other operating system. Additionally, other software modules and applications may run on the operating system, such as a flight control module 622, contingency module 624, application module 626, and database module 628. Typically flight critical functions will be performed using the UAV processing system 600. Operating system 620 may include instructions for handling basic system services and for performing hardware dependent tasks.

In addition to the UAV primary processing system 600, a secondary processing system 602 may be used to run another operating system to perform other functions. A UAV secondary processing system 602 can be a system of one or more computers, or software executing on a system of one or more computers, which is in communication with, or maintains, one or more databases. The UAV secondary processing system 602 can be a system of one or more processors 694, graphics processors 692, I/O subsystem 994 logic circuits, analog circuits, associated volatile and/or non-volatile memory, associated input/output data ports, power ports, etc., and/or one or more software processing executing one or more processors or computers. Memory 670 may include non-volatile memory, such as one or more magnetic disk storage devices, solid state hard drives, flash memory. Other volatile memory such a RAM, DRAM, SRAM may be used for storage of data while the UAV is operational.

Ideally modules, applications and other functions running on the secondary processing system 602 will be non-critical functions in nature, that is if the function fails, the UAV will still be able to safely operate. In some implementations, the operating system 972 can be based on real time operating system (RTOS), UNIX, LINUX, OS X, WINDOWS, ANDROID or other operating system. Additionally, other software modules and applications may run on the operating system 672, such as an application module 974, database module 676. Operating system 602 may include instructions for handling basic system services and for performing hardware dependent tasks.

Also, controllers 646 may be used to interact and operate a payload device 948, and other devices such as photographic camera 649, video camera, infra-red camera, multispectral camera, stereo camera pair, Lidar, radio transceiver, sonar, laser ranger, altimeter, TCAS (traffic collision avoidance system), ADS-B (Automatic dependent surveillance-broadcast) transponder. Optionally, the secondary processing system 602 may have coupled controllers to control payload devices.

Each of the processes, methods, and algorithms described in the preceding sections may be embodied in, and fully or partially automated by, code modules executed by one or more computer systems or computer processors comprising computer hardware. The code modules (or "engines") may be stored on any type of, one or more, non-transitory computer-readable media (e.g., a computer storage product) or computer storage devices, such as hard drives, solid state memory, optical disc, and/or the like. The systems and modules may also be transmitted as generated data signals (for example, as part of a carrier wave or other analog or digital propagated signal) on a variety of computer-readable transmission mediums, including wireless-based and wired/cable-based mediums, and may take a variety of forms (for example, as part of a single or multiplexed analog signal, or as multiple discrete digital packets or frames). The processes and algorithms may be implemented partially or wholly in application-specific circuitry. The results of the disclosed processes and process steps may be stored, persistently or otherwise, in any type of non-transitory computer storage such as, for example, volatile or non-volatile storage.

In general, the terms "engine" and "module", as used herein, refer to logic embodied in hardware or firmware, or to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on one or more computer readable media, such as a compact discs, digital video discs, flash drives, or any other tangible media. Such software code may be stored, partially or fully, on a memory device of the executing computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Generally, the modules described herein refer to logical modules that may be combined with other modules or divided into sub-modules despite their physical organization or storage.

User interfaces described herein are optionally presented (and user instructions may be received) via a user computing device using a browser, other network resource viewer, a dedicated application, or otherwise. Various features described or illustrated as being present in different embodiments or user interfaces may be combined into the same embodiment or user interface. Commands and information received from the user may be stored and acted on by the various systems disclosed herein using the processes disclosed herein. While the disclosure may reference to a user hovering over, pointing at, or clicking on a particular item, other techniques may be used to detect an item of user interest. For example, the user may touch the item via a touch screen, or otherwise indicate an interest. The user interfaces described herein may be presented on a user terminal, such as a laptop computer, desktop computer, tablet computer, smart phone, virtual reality headset, augmented reality headset, or other terminal type. The user terminals may be associated with user input devices, such as touch screens, microphones, touch pads, keyboards, mice, styluses, cameras, etc. While the foregoing discussion and figures may illustrate various types of menus, other types of menus may be used. For example, menus may be provided via a drop down menu, a tool bar, a pop up menu, interactive voice response system, or otherwise.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "for example," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y and Z," unless specifically stated otherwise, is otherwise understood with the context as used in general to convey that an item, term, etc. may be either X, Y or Z. Thus, such conjunctive language is not generally intended to imply that certain embodiments require at least one of X, at least one of Y and at least one of Z to each be present.

While certain example embodiments have been described, these embodiments have been presented by way of example only, and are not intended to limit the scope of the disclosure. Thus, nothing in the foregoing description is intended to imply that any particular element, feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, comprising:
   determining a geofence boundary to enforce against an unmanned aerial vehicle based on a survey area;
   determining, based on first information obtained from a user device, waypoints for the unmanned aerial vehicle to travel between to perform a survey within the survey area;
   determining, based on second information obtained from the user device, a survey type for the survey;
   determining a flight plan for the unmanned aerial vehicle to perform the survey based on the geofence boundary, the waypoints, and the survey type; and
   generating a flight data package configured to cause the unmanned aerial vehicle to navigate according to the flight plan;
   presenting, for display at the user device, a graphical user interface including one or more images of at least a portion of the survey area; and
   receiving the first information via the graphical user interface.

2. The method of claim 1, wherein the graphical user interface enables a user of the user device to specify one or more of an order in which the unmanned aerial vehicle is to travel between the waypoints, an action for the unmanned aerial vehicle to perform at one or more of the waypoints, or a transition speed for the unmanned aerial vehicle to navigate between two or more of the waypoints.

3. The method of claim 1, comprising:
   outputting, via a graphical user interface presented for display at a second user device, third information associated with the flight plan and the geofence boundary.

4. The method of claim 1, wherein the geofence boundary is determined based on information obtained from one or more of the user device, a commercial database, or a governmental database.

5. The method of claim 1, comprising:
   presenting, for display at the user device, a graphical user interface including selectable options associated with functionality for the unmanned aerial vehicle to perform; and
   receiving the second information via the graphical user interface based on a selection of one or more of the selectable options.

6. The method of claim 5, wherein the selectable options are limited based on a configuration of the unmanned aerial vehicle.

7. The method of claim 1, wherein the graphical user interface includes at least a portion of the flight path.

8. The method of claim 1, wherein the graphical user interface includes a highlighted area that defines the geofence boundary.

9. The method of claim 8, wherein the geofence boundary comprises a two-dimensional or three-dimension location-based boundary that can be understood as a virtual perimeter.

10. The method of claim 9, wherein the geofence boundary is represented on a map as a polygonal shape.

11. An apparatus, comprising:
    a memory; and
    a processor configured to execute instructions stored in the memory to:
    determine a geofence boundary to enforce against an unmanned aerial vehicle based on first information identifying a survey area;
    wherein, to determine the geofence boundary, the processor is configured to: present, for display at a user device, a first graphical user interface including one or more images of at least a portion of the survey area; and receive the first information via the first graphical user interface;
    determine a flight plan for the unmanned aerial vehicle to perform a survey within the survey area based on the geofence boundary and based on second information specifying a survey type for the survey; and
    generate a flight data package configured to cause the unmanned aerial vehicle to navigate according to the flight plan,
    wherein the first information and the second information are obtained from the user device.

12. The apparatus of claim 11, wherein, to determine the flight plan, the processor is configured to execute the instructions to:
    present, for display at the user device, a second graphical user interface including selectable options associated with functionality for the unmanned aerial vehicle to perform; and
    receive the second information via the second graphical user interface based on a selection of one or more of the selectable options.

13. The apparatus of claim 12, wherein a selectable option of the selectable options corresponds to a user request for application associated with an additional survey type, and wherein the processor is configured to execute the instructions to:

responsive to a selection of the selectable option, search an application store for an application configured for the additional survey type.

14. The apparatus of claim 11, wherein the processor is configured to execute the instructions to:

determine, based on third information obtained from the user device, waypoints for the unmanned aerial vehicle to travel between to perform the survey.

15. The apparatus of claim 14, wherein, to determine the flight plan, the processor is configured to execute the instructions to:

determine the flight plan based on the waypoints and the survey type.

16. The apparatus of claim 11, wherein the processor is configured to execute the instructions to:

transmit information associated with the flight data package to a requesting entity.

17. A flight planning system implemented as computer-executable instructions stored on one or more non-transitory computer-readable media, the flight planning system comprising:

a flight description engine configured to:
receive first information and second information via one or more user interfaces presented at a user device, the first information identifying waypoints for an unmanned aerial vehicle to travel between to perform a survey, within a survey area the second information identifying a survey type for the survey;
determine a flight plan for the unmanned aerial vehicle to perform the survey based on the waypoints and the survey type;
and present, for display at the user device, another user interface including one or more images of at least a portion of the survey area;

a permission control engine configured to determine a geofence boundary to enforce against the unmanned aerial vehicle for the survey; and a report generation engine configured to generate information associated with a flight data package based on the flight plan, wherein the flight data package is configured to cause the unmanned aerial vehicle to navigate according to the flight plan.

18. The flight planning system of claim 17, comprising:
an analysis engine configured to store, within a database, sensor information obtained by the unmanned aerial vehicle as the unmanned aerial vehicle performs the survey.

19. The flight planning system of claim 17, wherein the one or more user interfaces include selectable options associated with functionality for the unmanned aerial vehicle to perform and the information identifying the survey type is received based on a selection of one or more of the selectable options.

20. The flight planning system of claim 17, wherein the one or more user interfaces include one or more images of at least a portion of a survey area associated with the survey, and wherein the first information is received based on an interaction with the one or more images.

* * * * *